(12) United States Patent  (10) Patent No.: US 8,327,875 B2
Grace et al.  (45) Date of Patent: Dec. 11, 2012

(54) CHEMICAL-INJECTION MANAGEMENT SYSTEM

(75) Inventors: Andrew Grace, Shannon (IE); Gregory Greene, Westmeath (IE); Edmund McHugh, Longford Town (IE)

(73) Assignee: Cameron International Corporation, Houston, TX (US)

( * ) Notice: Subject to any disclaimer, the term of this patent is extended or adjusted under 35 U.S.C. 154(b) by 581 days.

(21) Appl. No.: 12/522,380

(22) PCT Filed: Jan. 31, 2008

(86) PCT No.: PCT/US2008/052681
§ 371 (c)(1),
(2), (4) Date: Jul. 7, 2009

(87) PCT Pub. No.: WO2008/095113
PCT Pub. Date: Aug. 7, 2008

(65) Prior Publication Data
US 2010/0043897 A1  Feb. 25, 2010

Related U.S. Application Data

(60) Provisional application No. 60/898,836, filed on Feb. 1, 2007.

(51) Int. Cl.
*F16K 31/12* (2006.01)
(52) U.S. Cl. .............. 137/487.5; 137/81.2; 166/344; 166/250.01
(58) Field of Classification Search ............... 137/81.2, 137/487.5; 166/344, 250.01
See application file for complete search history.

(56) References Cited

U.S. PATENT DOCUMENTS

| | | | | |
|---|---|---|---|---|
| 4,315,523 A * | 2/1982 | Mahawili et al. | | 137/486 |
| 5,194,012 A * | 3/1993 | Cairns | | 439/201 |
| 5,558,532 A * | 9/1996 | Hopper | | 439/310 |
| 5,794,701 A | 8/1998 | Cunningham et al. | | |
| 6,481,504 B1 * | 11/2002 | Gatherar | | 166/344 |
| 6,823,941 B2 * | 11/2004 | Donald | | 166/368 |
| 6,851,444 B1 * | 2/2005 | Kohl et al. | | 137/13 |
| 7,234,524 B2 * | 6/2007 | Shaw et al. | | 166/304 |
| 7,243,729 B2 * | 7/2007 | Tyrrell et al. | | 166/338 |
| 7,380,835 B2 * | 6/2008 | McCoy et al. | | 285/24 |
| 7,389,787 B2 | 6/2008 | Means et al. | | |
| 8,066,076 B2 * | 11/2011 | Donald et al. | | 166/344 |
| 2002/0011336 A1 * | 1/2002 | Baskett et al. | | 166/368 |
| 2008/0257032 A1 * | 10/2008 | Zollo et al. | | 73/152.29 |
| 2009/0025936 A1 * | 1/2009 | Donald et al. | | 166/344 |
| 2010/0126600 A1 * | 5/2010 | Watson | | 137/486 |

FOREIGN PATENT DOCUMENTS

| | | |
|---|---|---|
| EP | 1355166 | 10/2003 |
| GB | 2419905 | 5/2006 |
| WO | WO0037770 | 6/2000 |
| WO | WO2004016904 | 2/2004 |

OTHER PUBLICATIONS

PCT International Search Report and Written Opinion for PCT/US2008/52681, mailed Jul. 30, 2008.

* cited by examiner

*Primary Examiner* — Craig Schneider
*Assistant Examiner* — Matthew W Jellett
(74) *Attorney, Agent, or Firm* — Fletcher Yoder, P.C.

(57) ABSTRACT

An apparatus that includes a chemical-injection management system. The chemical-injection management system may include a tree interface configured to couple the chemical-injection management system to a tree and a positive-displacement flow meter.

25 Claims, 18 Drawing Sheets

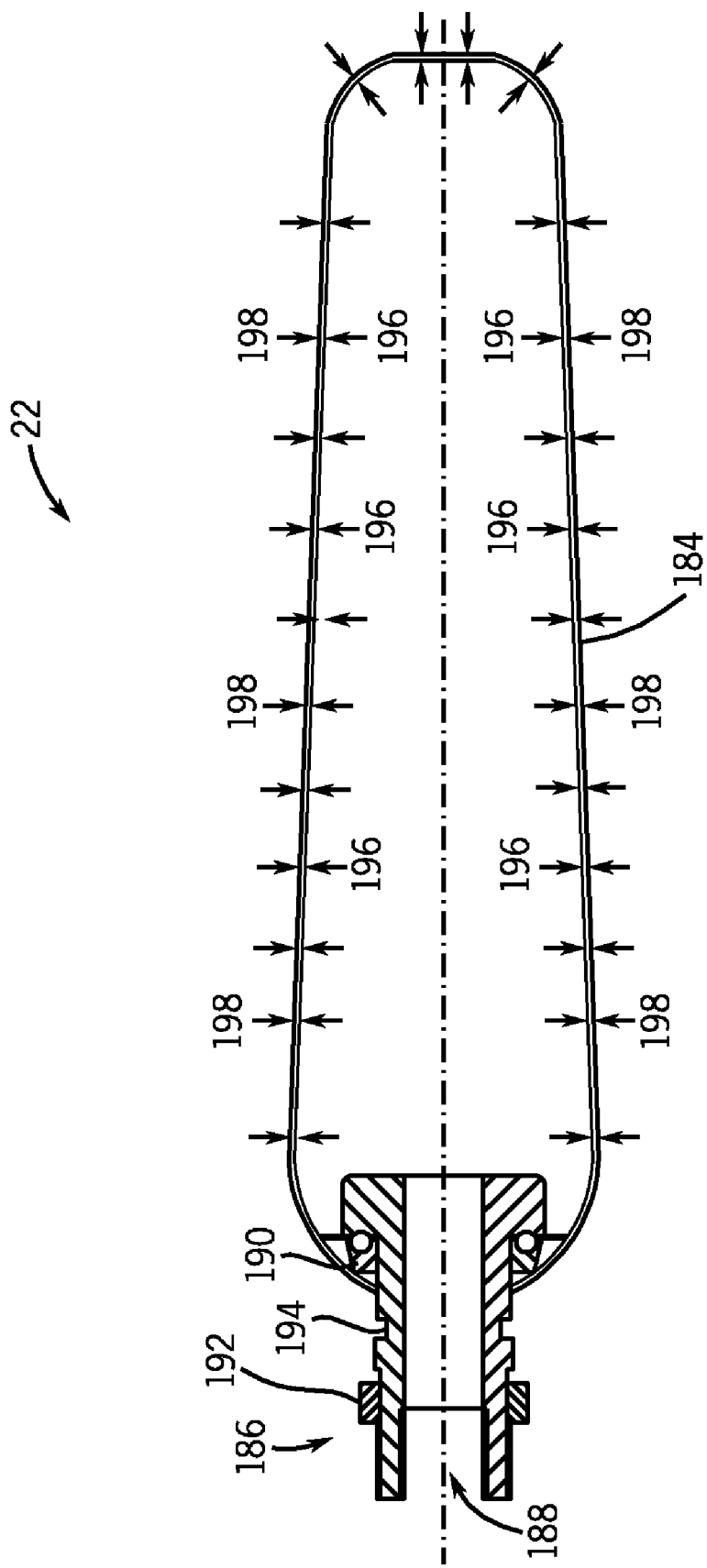

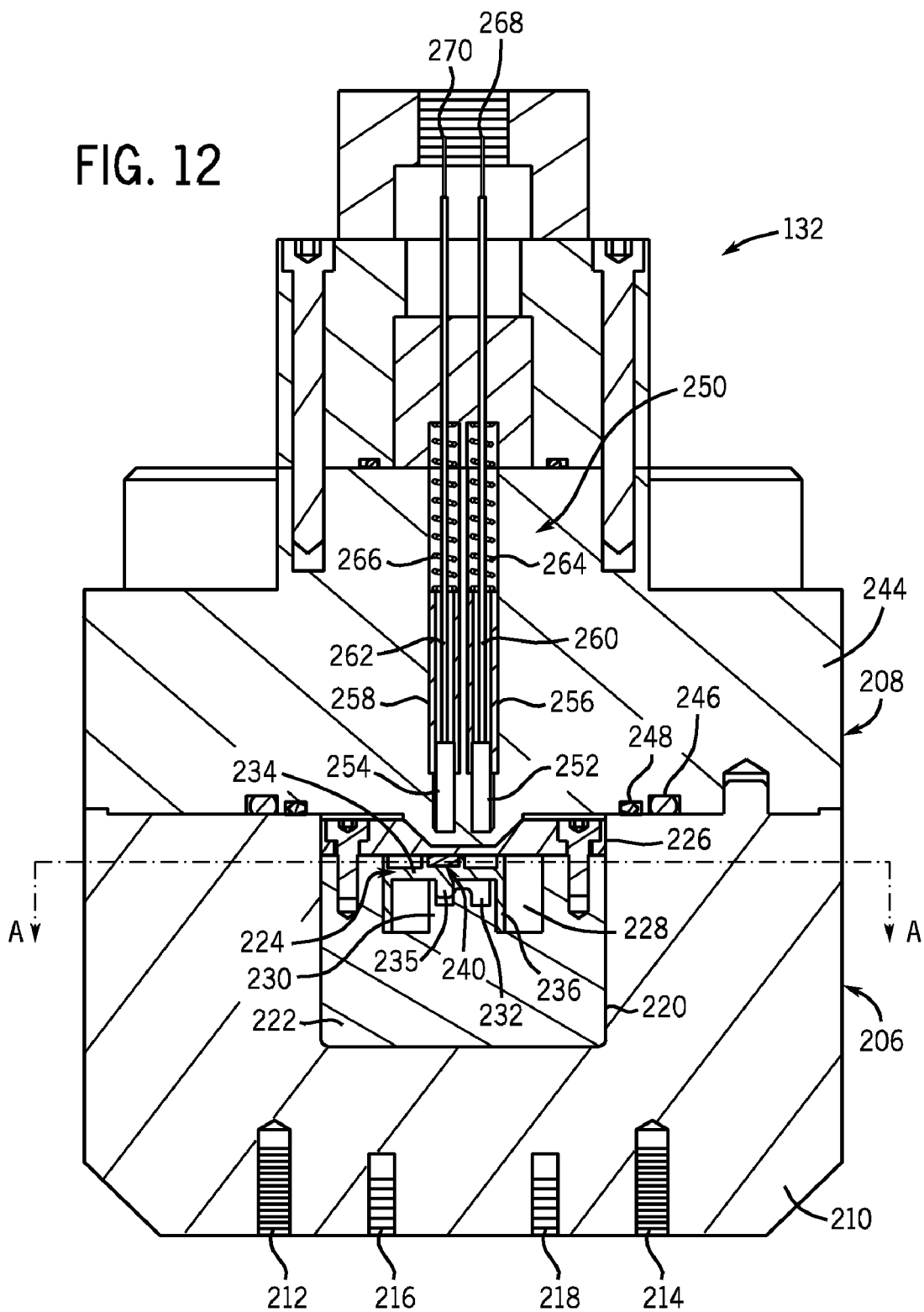

CHEMICAL-INJECTION MANAGEMENT SYSTEM

CROSS REFERENCE TO RELATED APPLICATION

This application claims priority to PCT Application No. PCT/US08/52681 entitled "Chemical-Injection Management System", filed on Jan. 31, 2008, which is herein incorporated by reference in its entirety, and which claims priority to U.S. Provisional Patent Application No. 60/898,836, entitled "Chemical-Injection Management System", filed on Feb. 1, 2007, which is herein incorporated by reference in its entirety

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Wells are often used to access resources below the surface of the earth. For instance, oil, natural gas, and water are often extracted via a well. Some wells are used to inject materials below the surface of the earth, e.g., to sequester carbon dioxide, to store natural gas for later use, or to inject steam or other substances near an oil well to enhance recovery. Due to the value of these subsurface resources, wells are often drilled at great expense, and great care is typically taken to extend their useful life.

Chemical-injection management systems are often used to maintain a well and/or enhance throughput of a well. For example, chemical-injection management systems are used to inject corrosion-inhibiting materials, foam-inhibiting materials, wax-inhibiting materials, and/or antifreeze to extend the life of a well or increase the rate at which resources are extracted from a well. Typically, these materials are injected into the well in a controlled manner over a period of time by the chemical-injection management system.

The life of a chemical-injection management system may be limited by its mechanical components, such as gearboxes, motors, and valves that can wear out. Further, sensors and actuators used to control flow rate can drift over time, and, as a result, the accuracy of the chemical-injection management system can decline. These problems may be particularly acute in sub-sea applications, where the chemical-injection management system may be difficult and/or expensive to access. Replacing a worn out or inaccurate chemical-injection management system can significantly add to the cost of operating a well, for instance.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein:

FIG. 10 is a cross-sectional view of an exemplary pressure equalizer in accordance with an embodiment of the present technique;

FIG. 12 is a cross-sectional view of an exemplary flow meter in accordance with an embodiment of the present technique;

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Certain exemplary embodiments of the present invention include a chemical-injection management system that addresses one or more of the above-mentioned inadequacies of conventional chemical-injection management systems. Some embodiments may include a flow regulator that has a positive-displacement flow meter, which, as explained below, may remain accurate over longer periods of time and under a wider variety of conditions than flow meters used in conventional flow regulators. In some embodiments, the flow regulator may be configured to exercise direct, feed-forward control of a valve, without using a nested valve-positioning feedback control loop. As explained below, flow regulators exercising feed-forward control of the valve may remain accurate over longer periods of time than systems exercising feedback control, which typically relies on system constants that may not be appropriate when valve components have worn or other conditions have changed. Additionally, or alternatively, some embodiments may immerse components of the chemical-injection management system in a protective fluid, such as oil, to reduce wear on moving components and potentially extend their useful life. To this end, some embodiments may have a sealed housing to contain the protective fluid and a pressure equalizer to reduce hydrostatic loads in subsea applications, as explained below. Prior to addressing these features in detail, aspects of a system that may employ such a chemical-injection management system are discussed.

Figure 1:
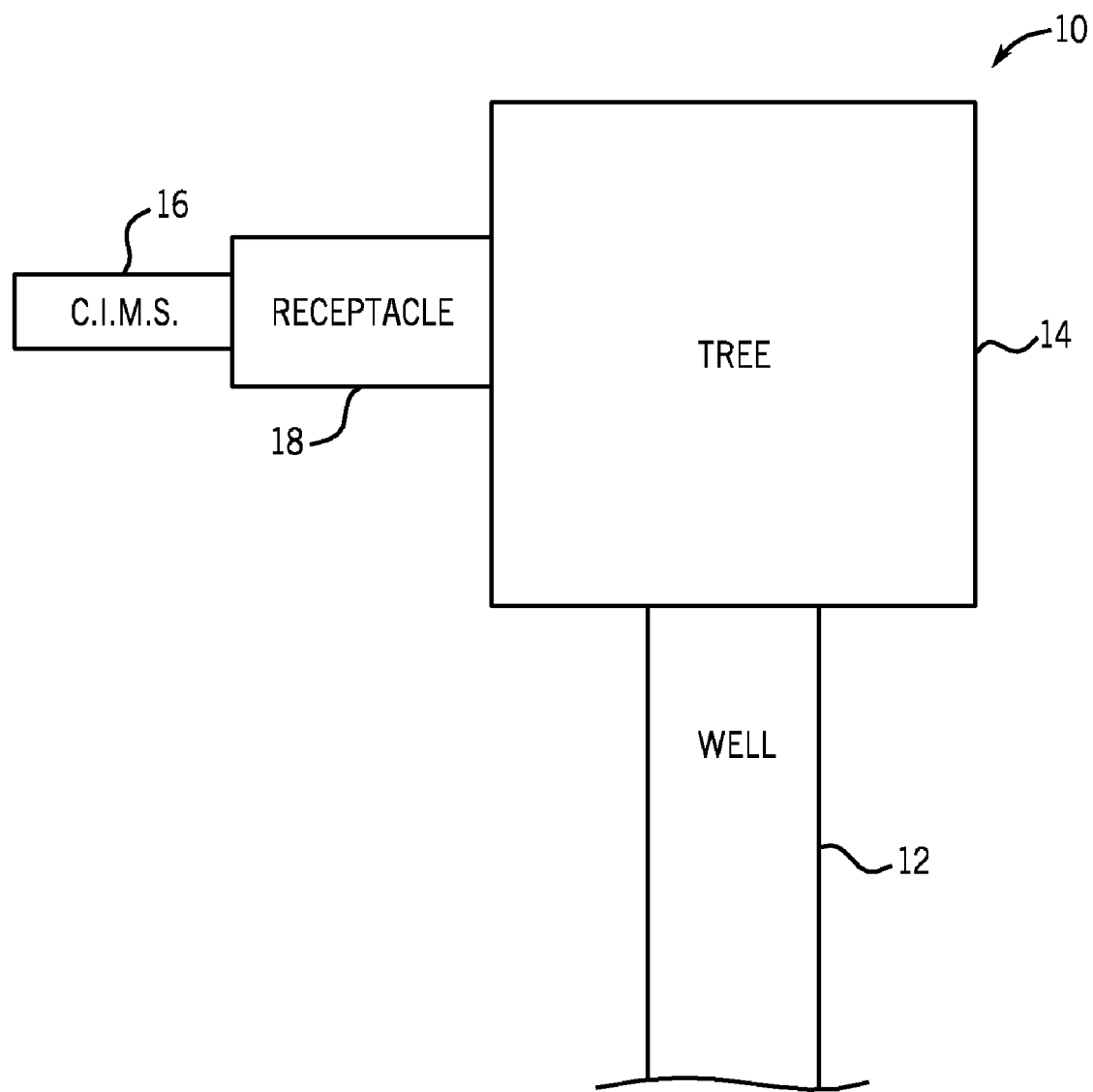
FIG. 1 is a perspective view of an exemplary resource extraction system in accordance with an embodiment of the present technique.

FIG. 1 depicts an exemplary resource extraction system 10 that may include a well 12, what is colloquially referred to as a "Christmas tree" 14 (hereinafter, a "tree"), a chemical-injection management system 16, and a valve receptacle 18. The illustrated resource extraction system 10 can be configured to extract hydrocarbons (e.g., oil and/or natural gas). In some embodiments, the resource extraction system 10 may be land-based or disposed a subsea, and/or configured to extract or inject other substances, such as those discussed above.

When assembled, the tree 14 may couple to the well 12 and include a variety of valves, fittings, and controls for operating the well 12. The chemical-injection management system 16 may be coupled to the tree 14 by the valve receptacle 18. The tree 14 may place the chemical-injection management system 16 in fluid communication with the well 12. As explained below, the chemical-injection management system 16 may be configured to regulate the flow of a chemical through the tree 14 and into the well 12.

Figure 2:
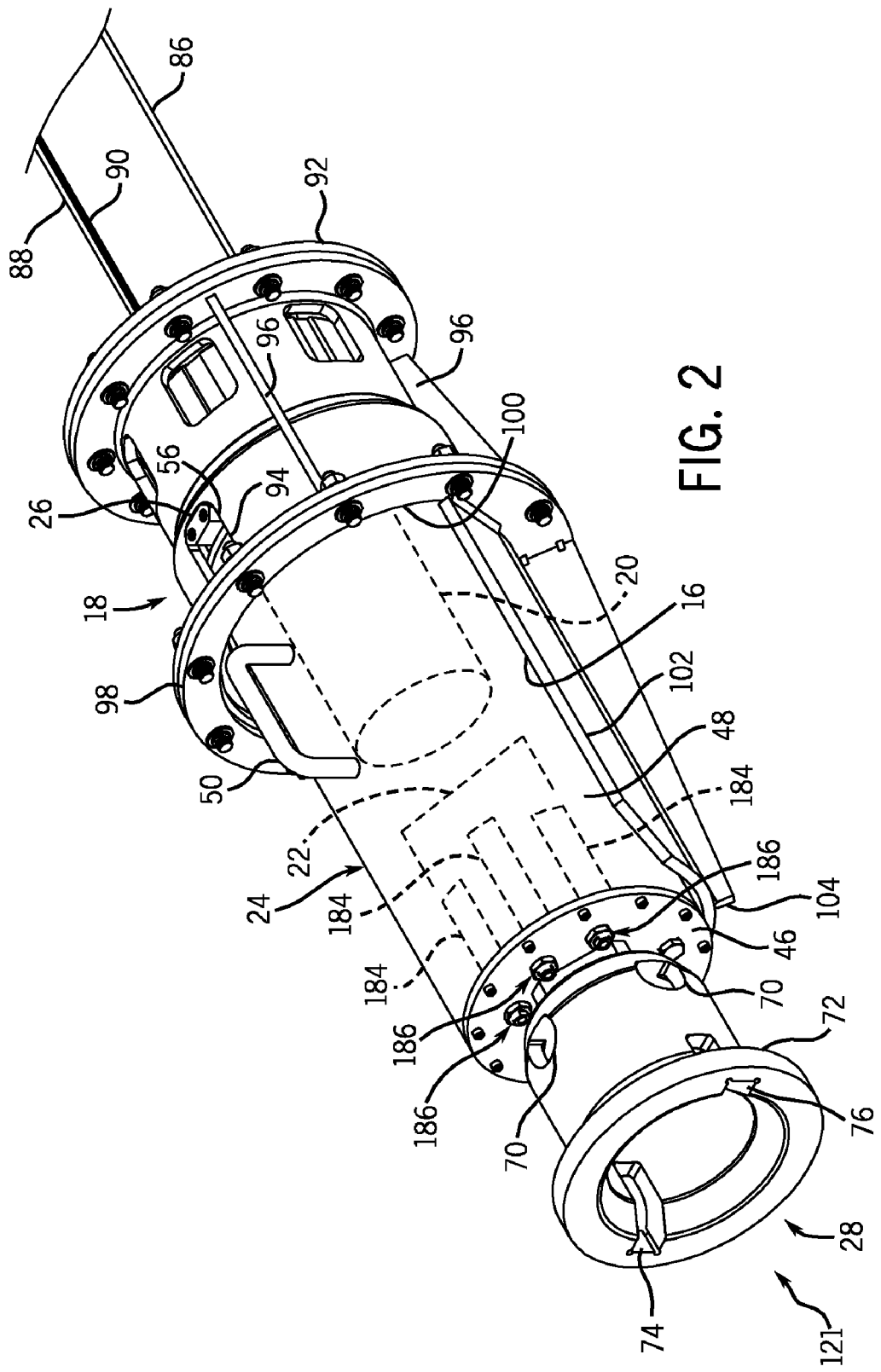
FIG. 2 is a partial perspective view of the resource extraction system of FIG. 1 that depicts an exemplary chemical-injection management system and a valve receptacle in accordance with an embodiment of the present technique.

FIG. 2 is a perspective view of the chemical-injection management system 16 mated with the valve receptacle 18. As illustrated, the chemical-injection management system 16 may include a flow regulator 20, a pressure equalizer 22, a housing 24, a tree interface 26, and an ROV (remotely operated vehicle) interface 28. As described in reference to FIGS. 5-8, the flow regulator 20 may include components that reduce the likelihood of the flow regulator 20 losing accuracy over time. As discussed in reference to FIGS. 10 and 11, the pressure equalizer 22 may facilitate the inclusion of a protective fluid, which is believed to extend the life of moving components within the housing 24. Prior to addressing these features in detail, other components of the chemical-injection management system 16 are discussed.

Figure 3:
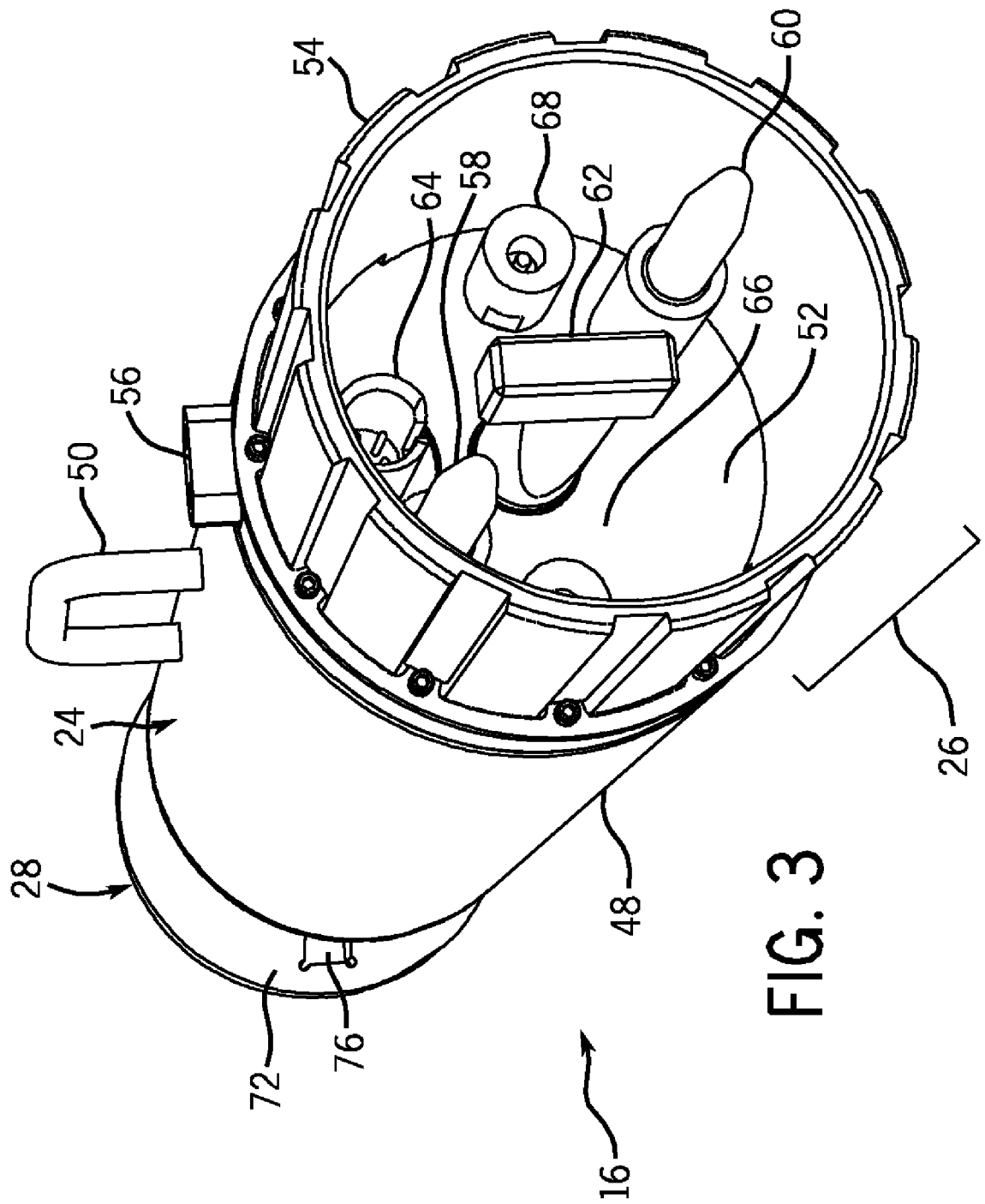
FIG. 3 is a rear-perspective view of the chemical-injection management system of FIG. 2.

With reference to FIGS. 2 and 3, the housing 24 may include an outer-end plate 46, a side wall 48, a handle 50, an inner-end plate 52, and a tree-interface shield 54. The side wall 48 and end plates 46 and 52 may be made from a generally rigid, corrosion-resistant material and may generally define a right cylindrical volume with a circular base. The tree-interface shield 54 may extend from the side wall 48 beyond the inner-end plate 52. The handle 50 may be affixed (for example, welded) to the side wall 48 and may have a U-shape. Some embodiments may include additional handles 50.

As illustrated by FIG. 3, the tree interface 26 may include a key 56, guide pins 58 and 60, a latch 62, an electrical connector 64, a fluid-inlet connector 66, and a fluid-outlet connector 68. In the present embodiment, with the exception of the key 56, the components of the tree interface 26 may be generally disposed within the tree-interface shield 54. These components may be configured to electrically, fluidly, and/or mechanically couple the chemical-injection management system 16 to the tree 14 via complementary components on the valve receptacle 18, as explained below after discussing the ROV interface 28.

The ROV interface 28 will now be described with reference to FIGS. 2 and 5. The illustrated ROV interface 28 may include apertures 70, a flared grip 72, slots 74 and 76, and a torque-tool interface 78. In some embodiments, the ROV interface 28 may be an API 17D class 4 ROV interface. The ROV interface 28 may be attached to the outer-end plate 46. The torque-tool interface 78, which may be configured to coupled to a torque tool on an ROV, may be disposed within the flared grip 72 and generally symmetrically between the slots 74 and 76.

Figure 5:
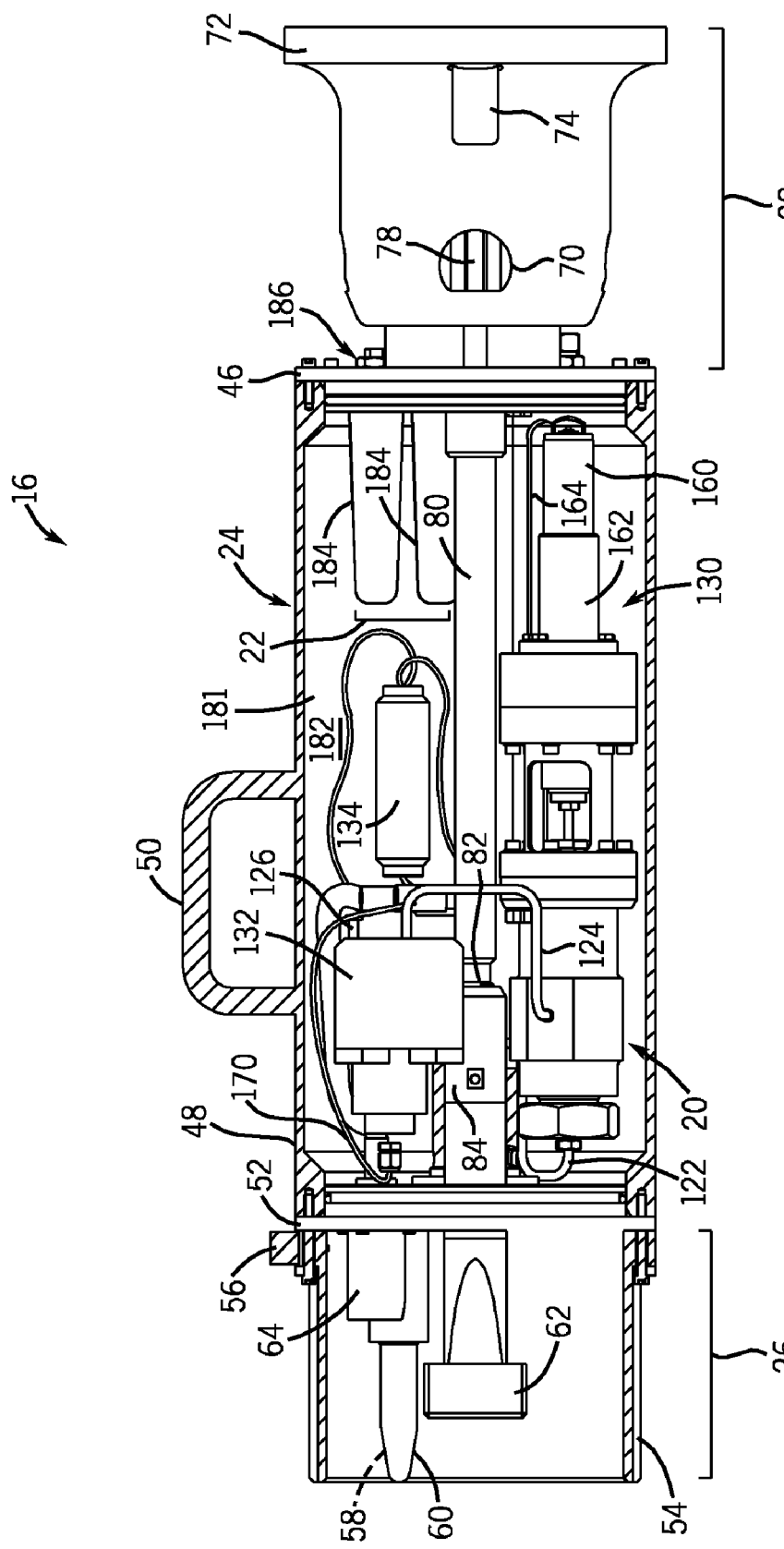
FIG. 5 is a cutaway view of the chemical-injection management system of FIG. 2.

As illustrated by FIG. 5, the torque-tool interface 78 may be coupled to an internal drive mechanism that includes a driveshaft 80, a threaded coupling 82, and a cam 84 that is linked to the latch 62. The operation of these components will be described after discussing features of the valve receptacle 18.

Figure 4:
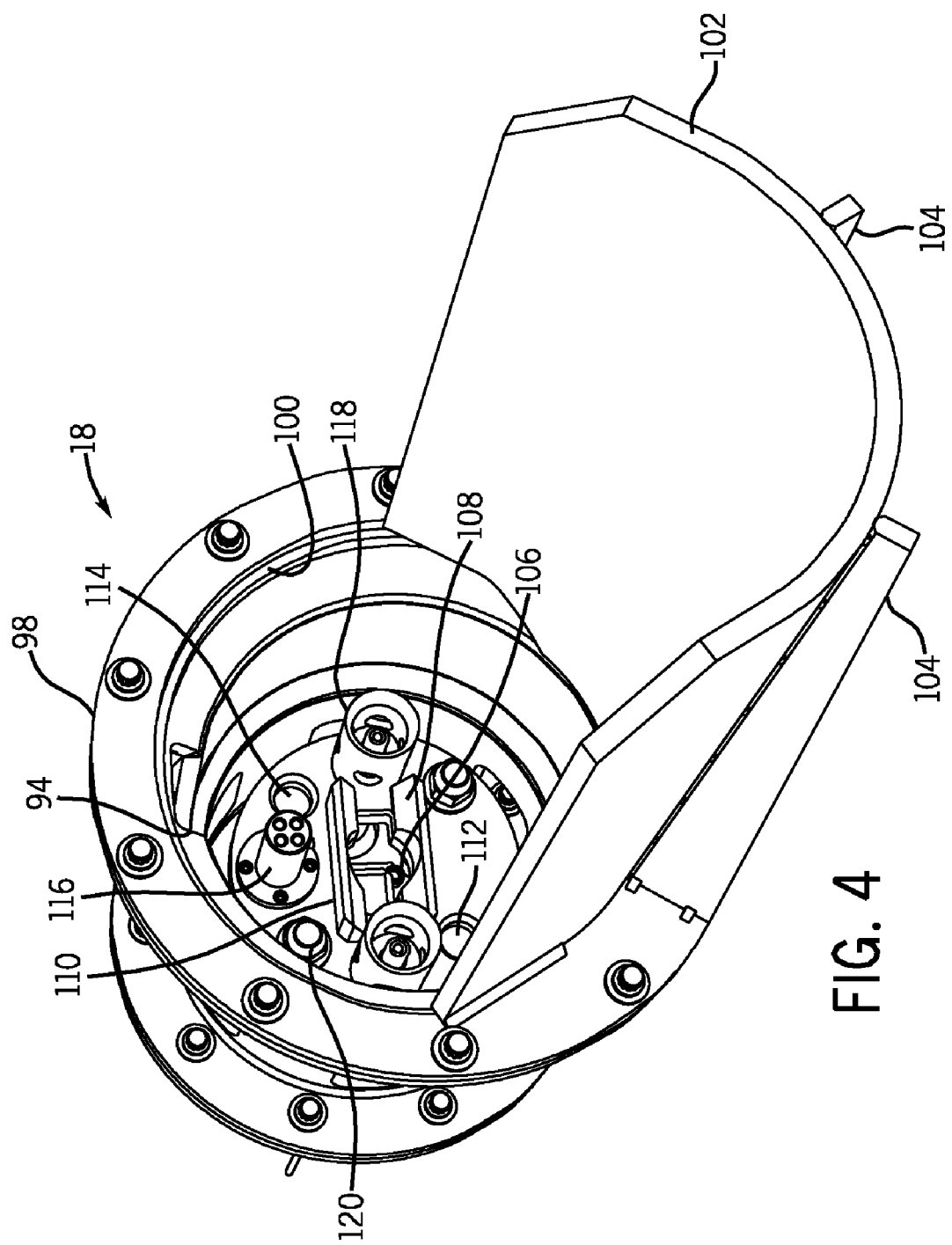
FIG. 4 is a perspective view of the valve receptacle of FIG. 2.

FIGS. 2 and 4 illustrate the exemplary valve receptacle 18. Starting with the features depicted by FIG. 2, the valve receptacle 18 may include a fluid inlet 86, a fluid outlet 88, an electrical connection 90, a mounting flange 92, a keyway 94, support flanges 96, an outer flange 98, a valve aperture 100, a valve tray 102, and tray supports 104. The fluid inlet 86 may be a fluid conduit, tube, or pipe that is in fluid communication with a fluid source, such as a supply of a liquid to be injected, and the fluid outlet 88 may be a fluid conduit, tube, or pipe that is in fluid communication with the well 12. The electrical connection 90 may couple to a power source, a user input device, a display, and/or a system controller. The mounting flange 92 may be configured to couple the valve receptacle 18 to the tree 14. The keyway 94 and the valve tray 102 may be configured to at least roughly align the chemical-injection management system 16 to the valve receptacle 18 during an installation of the chemical-injection management system 16. Specifically, the valve support tray 102 may be configured to support the chemical-injection management system 16 as it slides into the valve aperture 100, and the key 56 may be configured to slide into the keyway 94 to rotationally position the chemical-injection management system 16.

Turning to the features illustrated by FIG. 4, the valve receptacle 18 may include a slot 106, lead-in chamfers 108 and 110, chamfered apertures 112 and 114, a complementary electrical connector 116, a complementary fluid-inlet connector 118, and a complementary fluid-outlet connector 120. In the present embodiment, these components may be disposed within the valve aperture 100. The lead-in chamfers 108 and 110 and the slot 106 may be configured to align and receive the latch 62 from the chemical-injection management system 16, and the chamfered apertures 112 and 114 may be configured to receive the guide pins 58 and 60, respectively. Additionally, the complementary fluid-inlet connector 118 may be configured to fluidly couple the fluid inlet 86 to the fluid-inlet connector 66, and the complementary fluid-outlet connector 120 may be configured to fluidly couple the fluid outlet 88 to the fluid-outlet connector 68. The complementary electrical connector 116 may be configured to electrically couple the electrical connector 64 on the chemical-injection management system 16 to the electrical connection 90.

During installation, the chemical-injection management system 16 may be secured to an ROV above or near the surface of the ocean, e.g., on a support structure or vessel. The ROV may then submerge and convey the chemical-injection management system 16 to the tree 14 and place it on the valve tray 102. The ROV may rotate the chemical-injection management system 16 to align the key 56 with the keyway 94. The ROV may then drive the chemical-injection management system 16 forward into the valve aperture 1 00, as indicated by arrow 121. As the chemical-injection management system 16 moves forward, the guide pins 58 and 60 may mate or cooperate with the chamfered apertures 112 and 114 to further refine the alignment of the chemical-injection management system 16. With further forward movement, the latch 62 may be inserted through the slot 106 with the aid of the lead in chamfers 108 and 110.

To form the electrical and fluid connections, a torque tool on the ROV may then rotate the torque-tool interface 78, which may rotate the driveshaft 80 within the cam 84. The cam 84 may transmit approximately the first 90° of rotation of the driveshaft 80 into rotation of the latch 62, thereby positioning the latch 62 out of alignment with the slot 106 and generally preventing the latch 62 from being pulled back through the slot 106. After 90° of rotation, the cam 84 may generally cease transmitting rotation of the driveshaft 80, and the threaded coupling 82 may convert rotation of this draft 80 into a linear translation or pulling of the latch 62 back towards the housing 24. However, because the latch 62 is out of alignment with the slot 106, it may be generally prevented from moving backwards by the valve receptacle 18. As the latch 62 is pulled backwards, the chemical-injection management system 116 may gradually translate forward, and the electrical and fluid connections may be formed. Finally, the ROV may disengage from the chemical-injection management system 16 and return to the surface.

Figure 6:
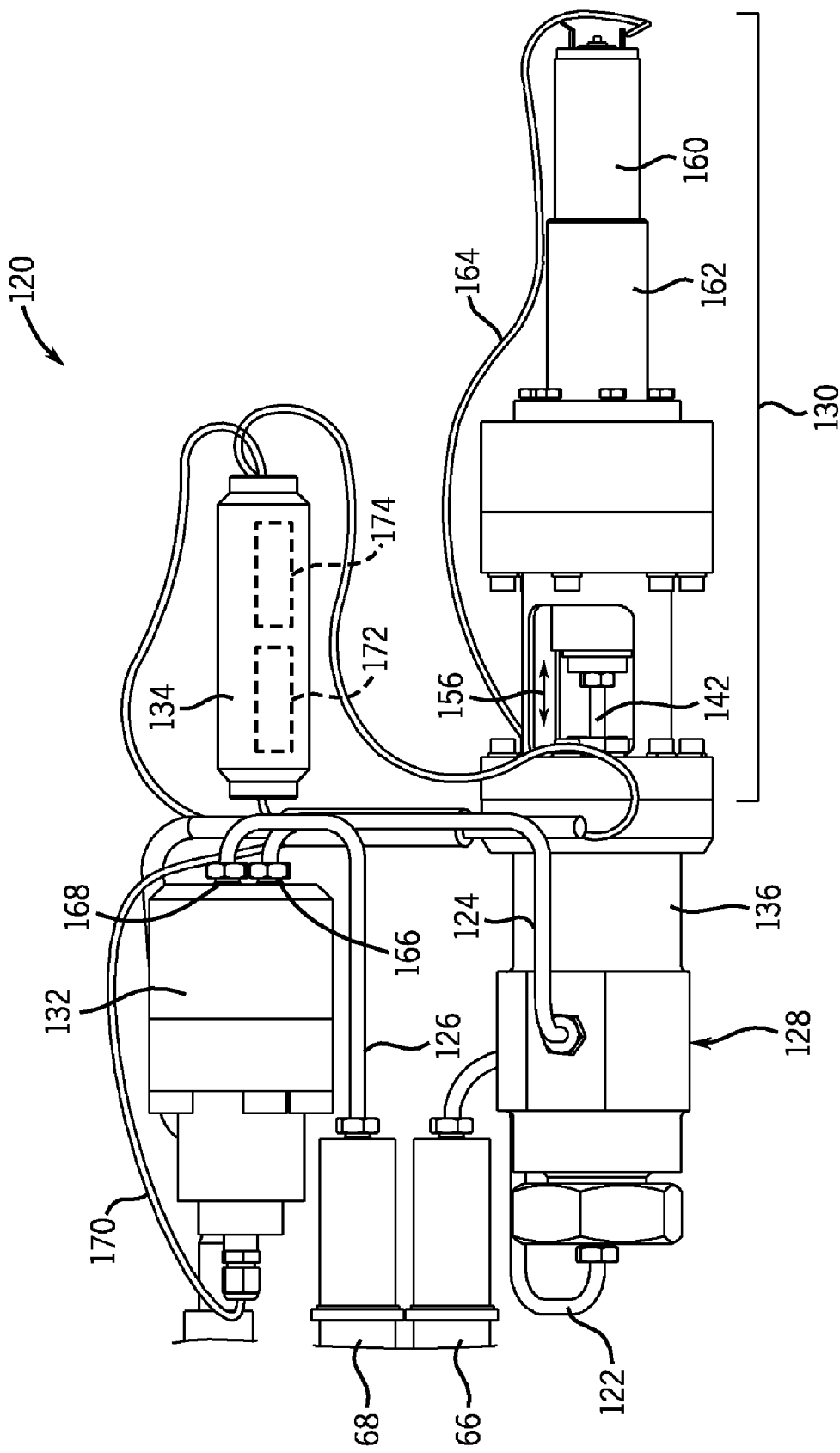
FIG. 6 is a side-view of an exemplary flow regulator in accordance with an embodiment of the present technique.
Figure 7:
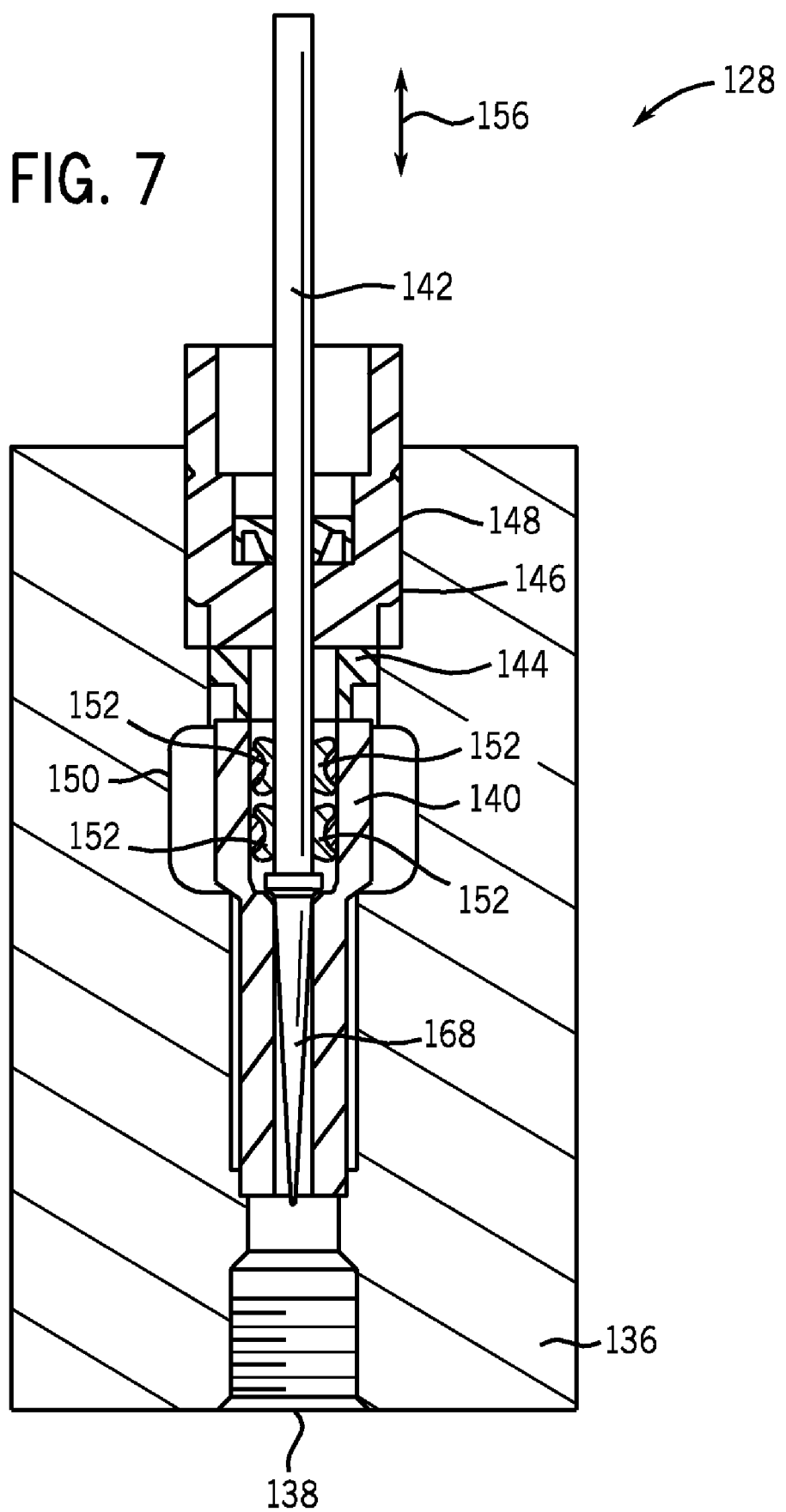
FIG. 7 is a cross-sectional view of an exemplary valve in accordance with an embodiment of the present technique.
Figure 8:
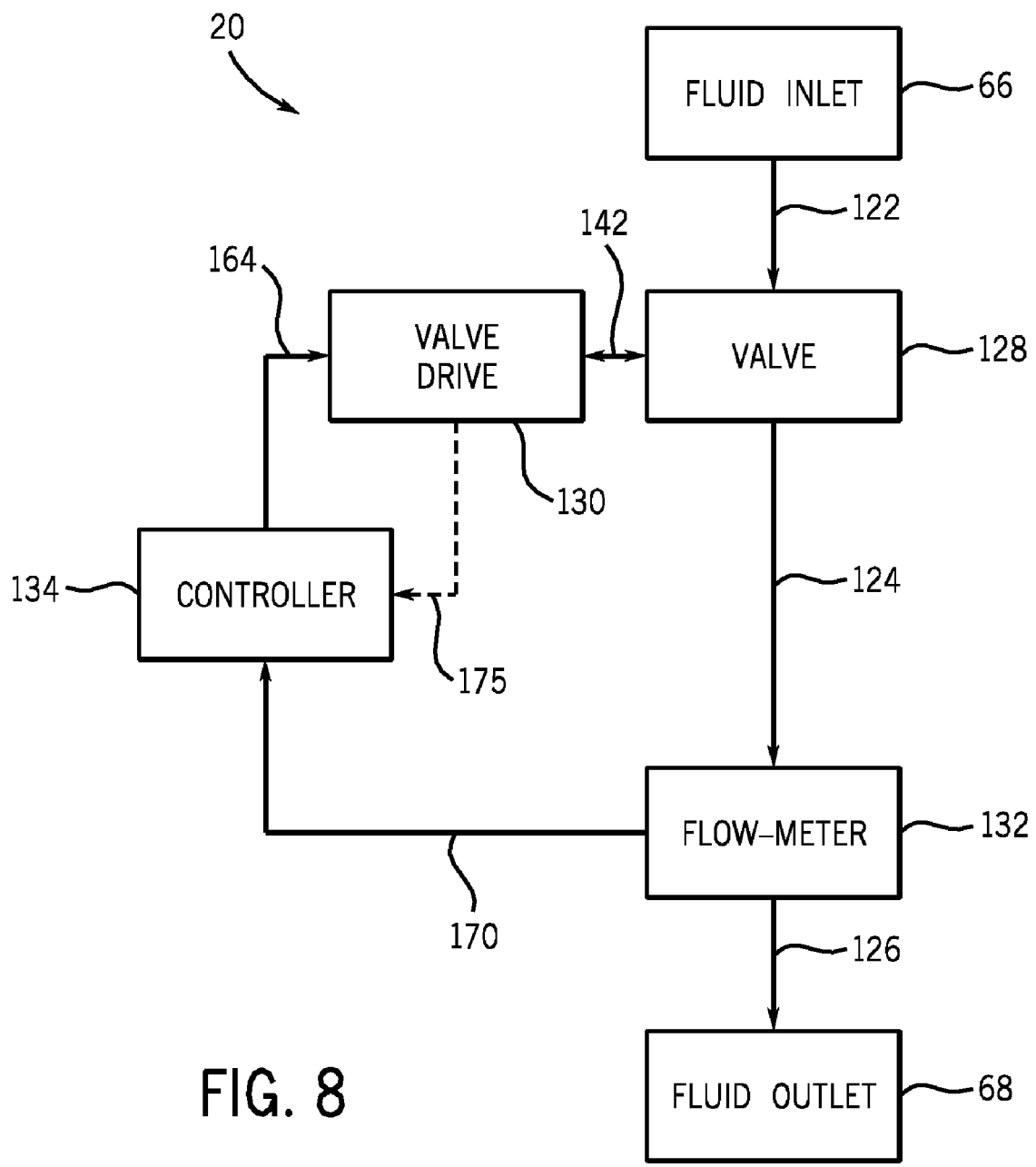
FIG. 8 is a diagrammatic view of the flow regulator of FIG. 6.
Figure 9:
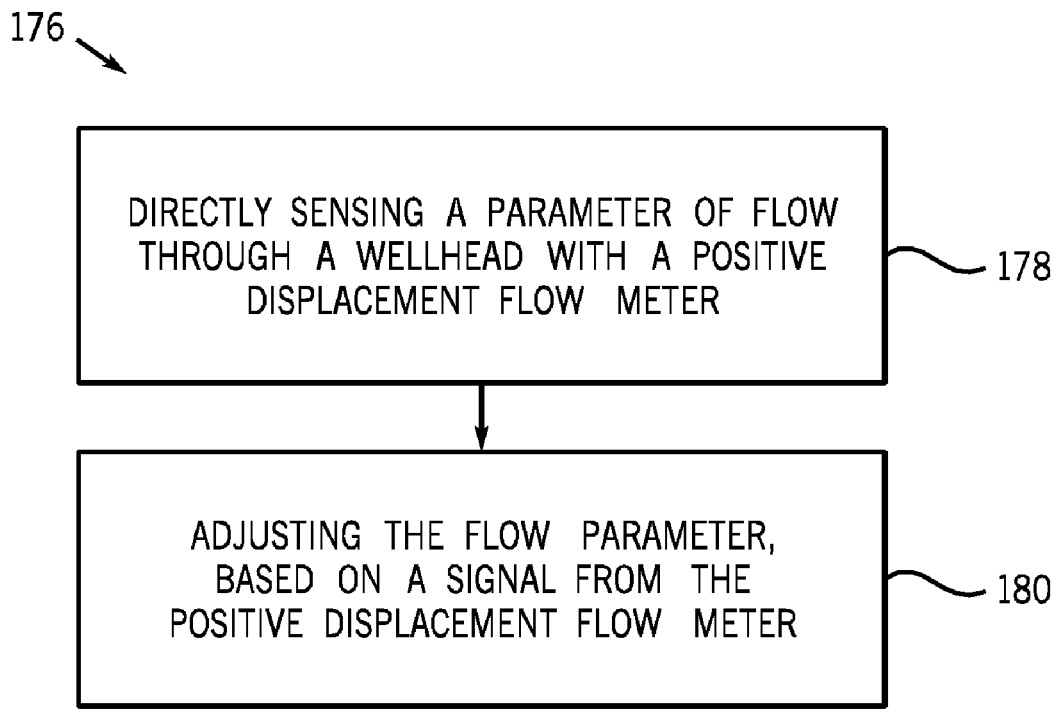
FIG. 9 is a flowchart of an exemplary flow control process in accordance with an embodiment of the present technique.

Features of the flow regulator 20 will now be described with reference to FIGS. 5-9. FIG. 5 illustrates the flow regulator 20 within a cutaway portion of the housing 24, and a FIG. 6 illustrates the flow regulator 20 in isolation. FIG. 7 is a cross-sectional view of a valve that may be employed in the flow regulator 20, and FIG. 8 is a diagrammatic representation of the flow meter 20. FIG. 9 illustrates an exemplary flow control process that may be executed by the flow regulator 20.

Turning to FIG. 6, flow regulator 20 may include fluid conduits 122, 124, and 126, a valve 128, a valve drive 130, a flow meter 132, and a controller 134. As explained below, the flow regulator 20 may be configured to regulate or control a flow parameter, such as a volumetric flow rate, a mass flow rate, a volume, and/or a mass of fluid flowing into the well 12.

Features of the exemplary valve 128 are depicted in the cross-sectional view of FIG. 7. The valve 128 may include a body 136, a threaded inlet 138, a needle seat 140, a needle 142 seals 144,146, and 148, and an outlet manifold 150. The illustrated needle seat 140 may include apertures 152 and a narrowed fluid path 154. The needle 142 may be configured to linearly translate through the body 136, as indicated by arrow 156, and may include a tapered tip 158 disposed generally within the needle seat 140.

In operation, a fluid may flow in through the threaded inlet 138, pass through the needle seat 140, and flow out of the valve 128 through conduit 124, which may be coupled to be outlet manifold 150. The needle 142 may be moved as indicated by arrow 156 to control the flow rate through the valve 128. As the needle 142 is withdrawn or moved upwards, a gap between the tapered tip 158 and the narrowed fluid path 154 of the needle seat 140 may expand, and the flow rate may increase. Conversely, as the needle 142 is driven into the body 136 or moved downwards, the gap between the tapered tip 158 and the narrowed fluid path 154 may decrease, and the flow rate through the valve 128 may decrease. That is, the flow rate through the valve 128 may generally correspond with the position of the needle 142. The valve 128 may have a turndown ratio greater than or equal to 100:1, and some embodiments may include two or more valves 128 that are each sized for different flow rates.

Returning to FIG. 6, the illustrated valve drive 130 may include a motor 160, a gearbox 162, and a control signal path 164. The motor 160 may have a direct-current (DC) motor, for instance, a 20-24 volt DC electric motor with. In certain embodiments, the gearbox 162 includes a high power ratio planetary gearbox with a gear ratio in excess of 600:1. In some embodiments, these components 160 and 162 may be immersed in an oil filled environment, as explained below. Advantageously, such an environment may tend to reduce wear on these components 160 and 162.

The flow meter 132 may include a fluid inlet 166, a fluid outlet 168, and a measurement signal path 170. In some embodiments, the flow meter 132 may be a positive-displacement flow meter. That is, the flow meter 132 may be configured to directly measure a flow rate or amount by sensing a volume displaced by a fluid flowing there-through. For example, the flow meter 132 may be configured to measure the volume or flow rate of a moving fluid by dividing the fluid into generally fixed, metered volumes. The number of metered volumes may generally determine the volume and/or mass of fluid flowing there-through, and the number of metered volumes per unit time may generally determine the volumetric and/or mass flow rate of the fluid flowing therethrough. In some embodiments, the flow meter 132 may include a piston and cylinder assembly, a peristaltic device, a rotary vane meter, a oval-gear meter, a vortex meter, and/or a nutating disk meter. The flow meter 132 may have a turndown ratio greater than or equal to 100:1, 300:1, 700:1, or 1000:1. The flow meter 132 may be generally free of bearings and generally chemically resistant. Additionally, in some embodiments, the flow meter 132 may be rated for pressures greater than the 5 ksi, 10 ksi, 15 ksi, or 20 ksi.

Advantageously, a positive-displacement flow meter may exhibit less drift over long periods of time (e.g., over several years) and may maintain accuracy with a variety of different types of fluids. Because the positive-displacement flow meter 132 measures flow rates and/or volumes directly (rather than inferring flow rates and volumes from a correlation between some other parameter, such as pressure drop across an orifice plate, and flow rate) the positive-displacement flow rate meter 132 may be subject to fewer sources of error and may be easier to calibrate than other types of flow meters. However, it should be noted that in other embodiments other types of flow meters may be employed, such as a differential pressure flow meter.

The controller 134 may include a processor 172 and memory 174. The controller 134 may be configured to determine a volumetric flow rate, a mass flow rate, a volume, or a mass based on a signal from the flow meter 132. The controller 134 may also be configured to regulate or control one or more of these parameters based on the signal from the flow meter 132 by signaling the motor 160 to adjust the position of the needle 142. To this end, the controller 134 may include software and/or circuitry configured to execute a control routine, such as a proportional-integral-differential (PID) control routine. In some embodiments, the control routine and/or data based on the signal from the flow meter 132 may be stored in memory 174 or another computer-readable medium.

FIG. 8 is a diagrammatic representation of the flow regulator 20. Starting with the connections configured to convey fluids, the fluid-inlet connector 66 may be fluidly coupled to the threaded inlet 138 of the valve 128 by fluid conduit 122. The fluid outlet manifold 150 of the valve 128 may be fluidly coupled to the fluid inlet 166 of the flow meter of 132 by the fluid conduit 124. Additionally, the fluid outlet 168 of the flow meter 132 may be fluidly coupled to the fluid-outlet connector 68 by fluid conduit 126. Turning to the connections configured to convey information, data, and/or control signals, the controller 134 may be communicatively coupled to the flow meter 132 by measurement signal path 170 and to the valve drive 130 by control signal path 164. Additionally, the controller 134 may be communicatively coupled to the electrical connector 64 for communication with other components of the resource extraction system 10 and for a source of power. The needle 142 mechanically links the valve drive 132 and the valve 128.

In operation, the controller 134 may exercise feedback control over fluid flow through the flow regulator 20. The controller 134 may transmit a control signal to the valve drive 130. The content of the control signal may be determined by, or based on, a comparison between a flow parameter (e.g., a volumetric flow rate, a mass flow rate, a volume, or a mass) measured by the flow meter 132 and a desired value of the flow parameter. For instance, if the controller 134 determines that the flow rate through the flow regulator 20 is less than a desired flow rate, the controller 134 may signal the valve drive 130 to withdraw the needle 142 some distance. In response, the motor 160 may drive the gearbox 162, and the gearbox 162 may convert rotational movement from the motor 160 into linear translation of the needle 142. As a result, in some embodiments, the flow rate through the valve 128 may increase as the gap between the tapered tip 158 of the needle 142 and the narrowed fluid path 154 of the needle seat 140 increases. Alternatively, if the controller 1 34 determines that the flow rate (or other flow parameter) through the flow regulator 20 is greater than a desired flow rate (or other flow parameter), the controller 134 may signal the valve drive 130 to drive the needle 142 some distance into the valve 128, thereby potentially decreasing the flow rate. In other words, the controller 134 may signal the valve drive 130 to move the needle 142 some distance based on a flow parameter sensed by the flow meter 132.

To control the flow parameter, the controller 134 may exercise feedback and/or feed-forward control of the valve drive 130. For instance, in some embodiments, the controller 134 may receive a drive feedback signal 175 that is indicative of, or correlates with, the position of the needle 142. Using the drive feedback signal 175, the controller 134 may exercise feedback control over the position of the needle 142. That is, the controller 134 may send a control signal 164 that is determined, at least in part, by a comparison between the drive feedback signal 175 and a desired needle position. The desired needle position may be determined by a table, equation, and/or relationship stored in memory 174 that correlates needle position with flow rate through the valve 128. Embodiments employing feedback control over both the position of the needle 142 and the flow parameter may be characterized as having a nested control loop, e.g., a feedback control loop directed toward controlling the needle position nested within a feedback control loop directed towards controlling the flow parameter.

Some embodiments may not include a nested control loop or may employ a nested control loop in a more limited fashion. For instance, in some embodiments, the controller 134 may not receive the drive feedback signal 175 or may partially or entirely disregard the drive feedback signal 175. In certain embodiments, the controller 134 may exercise feed-forward control over the position of the needle 142. That is, the controller 134 may transmit control signal 164 to the valve drive 130 based on a difference between a desired flow parameter value and a measured flow parameter value, regardless of a current position of the needle 142. In other words, some embodiments may not rely on a stored correlation between needle position and flow rate through the valve 128. For instance, in operation, the controller 134 may determine that the current volumetric flow rate through the flow regulator 20 is less than the desired volumetric flow rate and, in response, signal the valve drive 130 to shift the position of the needle 142 some distance. In some embodiments, the controller 134 may determine this distance without regard to the current position of the needle 142.

Advantageously, embodiments without a nested control loop may control flow parameters more accurately over a longer period of time and under a wider variety of circumstances than conventional systems. Because some embodiments do not rely on a correlation between the position of the needle 142 and a flow rate through the valve 128, they may be more robust in the face of changing conditions. For example, the tapered tip 158 of the needle 142 or the narrowed fluid path 154 of the needle seat 140 may wear and change the relationship between the position of the needle 142 and the flow rate through the valve 128. Such a change could introduce error when exercising feedback control of the position of the needle 142. In some circumstances, this error could decrease the responsiveness, stability, or accuracy of the flow regulator 20. In contrast, embodiments without a nested control loop for controlling the position of the needle 142 may be affected less by these sources of error.

FIG. 9 is a flowchart illustrating an exemplary flow control process 176. The flow control process 176 may include directly sensing a flow parameter of a flow through a wellhead with a positive-displacement flow meter, as indicated by block 178, and adjusting the flow parameter based on a signal from the positive-displacement flow meter, as depicted by block 180. Adjusting the flow parameter may include partially or entirely opening or closing a valve by exercising feedback and/or fee-forward control over the degree to which the valve is open or closed.

The exemplary flow control process 176 may result in relatively robust control of the flow parameter over long periods of time. As discussed above, certain positive-displacement flow meters are believed to have improved reliability (i.e., improved accuracy or precision over time) because they measure flow directly rather than infer flow rate from a correlation between some other parameter (such as a pressure drop across an orifice plate) and flow rate. Such positive-displacement flow meters may be robust and responsive to changes in the relationship between the parameter and flow rate. Further, embodiments that do not exercise feedback control over the degree to which the valve is open or closed (or at least, direct, nested feedback control of valve position) may be robust and responsive to changes in the relationship between flow rate and valve position.

Other features of the chemical-injection management system 16 may tend to extend its useful life. For example, returning to FIG. 5, an interior 181 of the housing 24 may be partially or substantially entirely filled with a protective fluid 182, such as oil. In some embodiments, the protective fluid 182 may be hydraulic gear oil. Advantageously, the protective fluid 182 may lubricate and/or tend to reduce wear on components inside the housing 24, such as the driveshaft 80, the cam 84, the threaded coupling 82, and/or the valve drive 130. To maintain separation of sea water and the protective fluid 182, the housing 24 may be substantially watertight. In some sub-sea applications, a difference in pressure between the protective fluid 182 and surrounding sea water may exert a hydrostatic load on the housing 24. To reduce this load, the chemical-injection management system 16 may include a pressure equalizer 22.

Features of the exemplary pressure equalizer 22 will now be described with reference to FIGS. 2, 5, 10, and 11. As illustrated by FIGS. 2 and 5, the pressure of equalizer 22 may include one or more bladders 184 and fittings 186. The pressure equalizer 22 may extend inward into the housing 24 from the outer-end plate 46. Some embodiments may include 1, 2, 3, 4, 5, or more bladders.

FIG. 10 illustrates a cross-sectional view of the exemplary pressure equalizer 22. The bladder 184 may be made of a resilient and/or watertight material, such as rubber, neoprene, vinyl, or silicone. The bladder 184 may have a generally cylindrical shape and couple to the fitting 186 at one end.

The illustrated fitting 186 may include a water inlet 188, sealing members 190 and 192, and an O-ring seat 194. The water inlet 188 may extend through the fitting 186 and provide a fluid passage into the bladder 184. The sealing member 190 may seal the bladder 184 to the fitting 186. The sealing member 192 and O-ring seat 194 may cooperate with an aperture in the outer-end plate 46 to secure the fitting 186 to the outer-end plate 46 and form a generally watertight seal with the outer-end plate 46. In some embodiments, the fitting 186 may include threads that cooperate with complementary threads on the outer-end plate 46 and/or a threaded nut disposed outside of the outer-end plate 46.

In operation, the pressure equalizer 22 may tend to reduce a difference in pressure between the protective fluid 182 and surrounding water pressure. The forces from surrounding water pressure on the bladder 184 are depicted by arrows 196 in FIG. 10, and the forces from the pressure of the protective fluid 182 are illustrated by arrows 198. If the water pressure 196 is greater than the pressure of the protective fluid 198, the bladder 184 may expand and/or apply a force to the protective fluid 182 and increase the pressure 198 of the protective fluid 182, thereby potentially reducing the pressure differential. In some embodiments, the protective fluid 182 may be substantially incompressible and the bladder 184 may primarily transmit a force rather than expand to equalize pressure.

Some embodiments may include other types of pressure equalizers 22, such as a piston disposed within a cylinder that is in fluid communication with the protective fluid 182 and surrounding seawater on respective opposite sides of the piston. In another example, the pressure equalizer 22 may include a resilient or less rigid portion of the housing 24 that is configured to transmit a force to the protective fluid 182.

Figure 11:
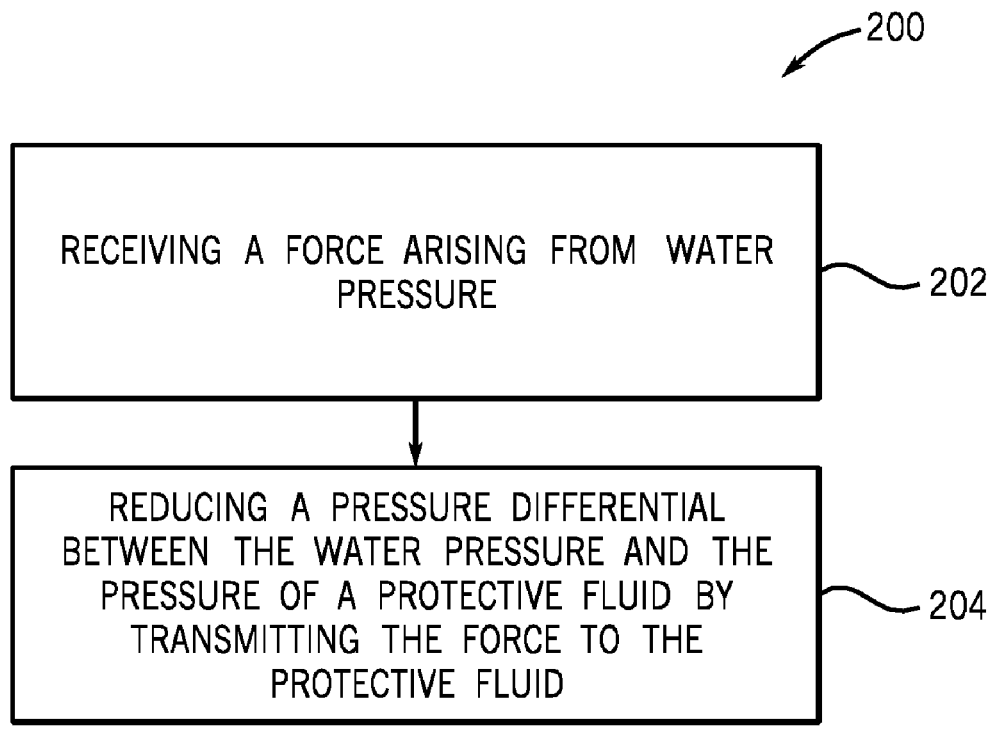
FIG. 11 is a flowchart depicting an exemplary pressure equalization process in accordance with an embodiment of the present technique.
Figure 13:
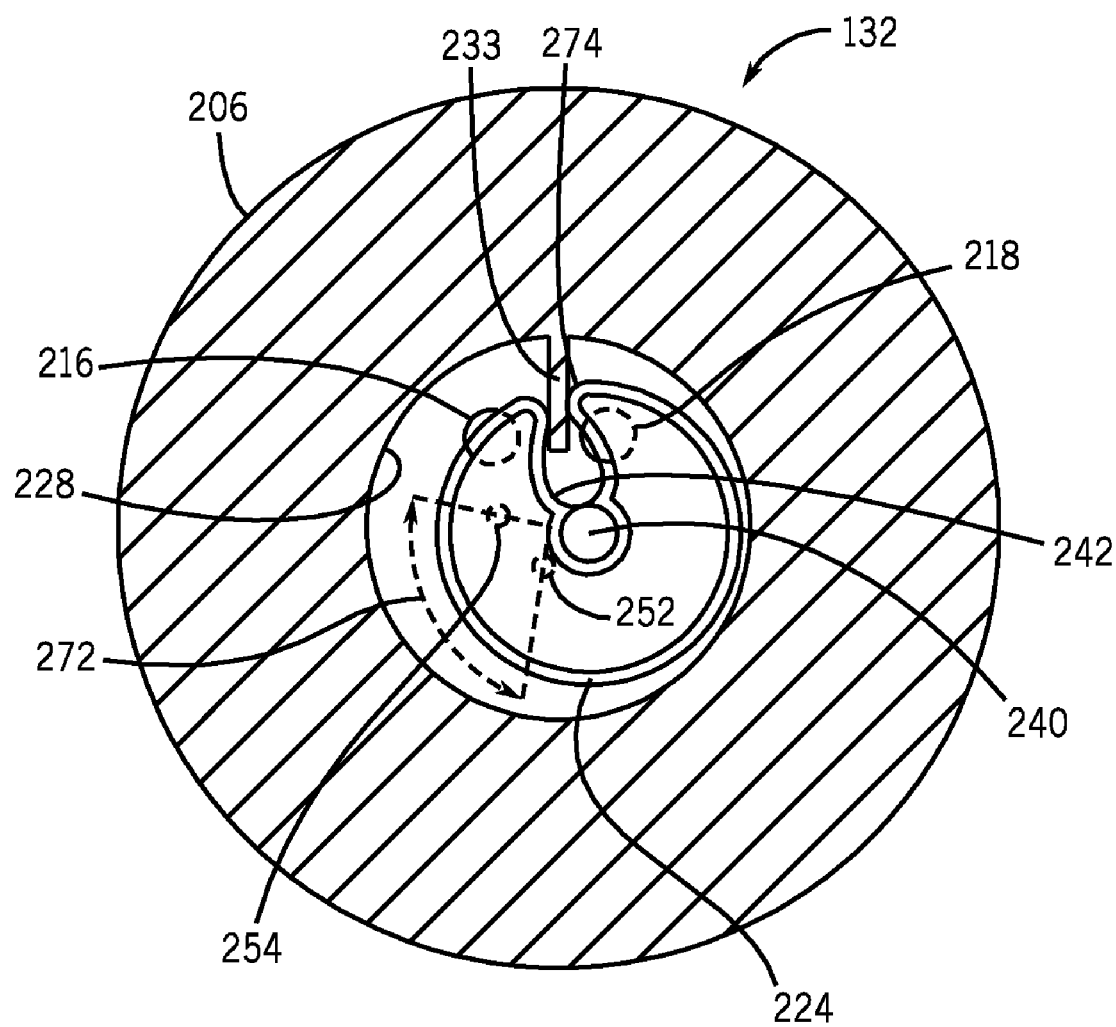
FIGS. 13-16 are a cross-sectional views of the flow meter of FIG. 12 in four sequential stages of operation.
Figure 14:
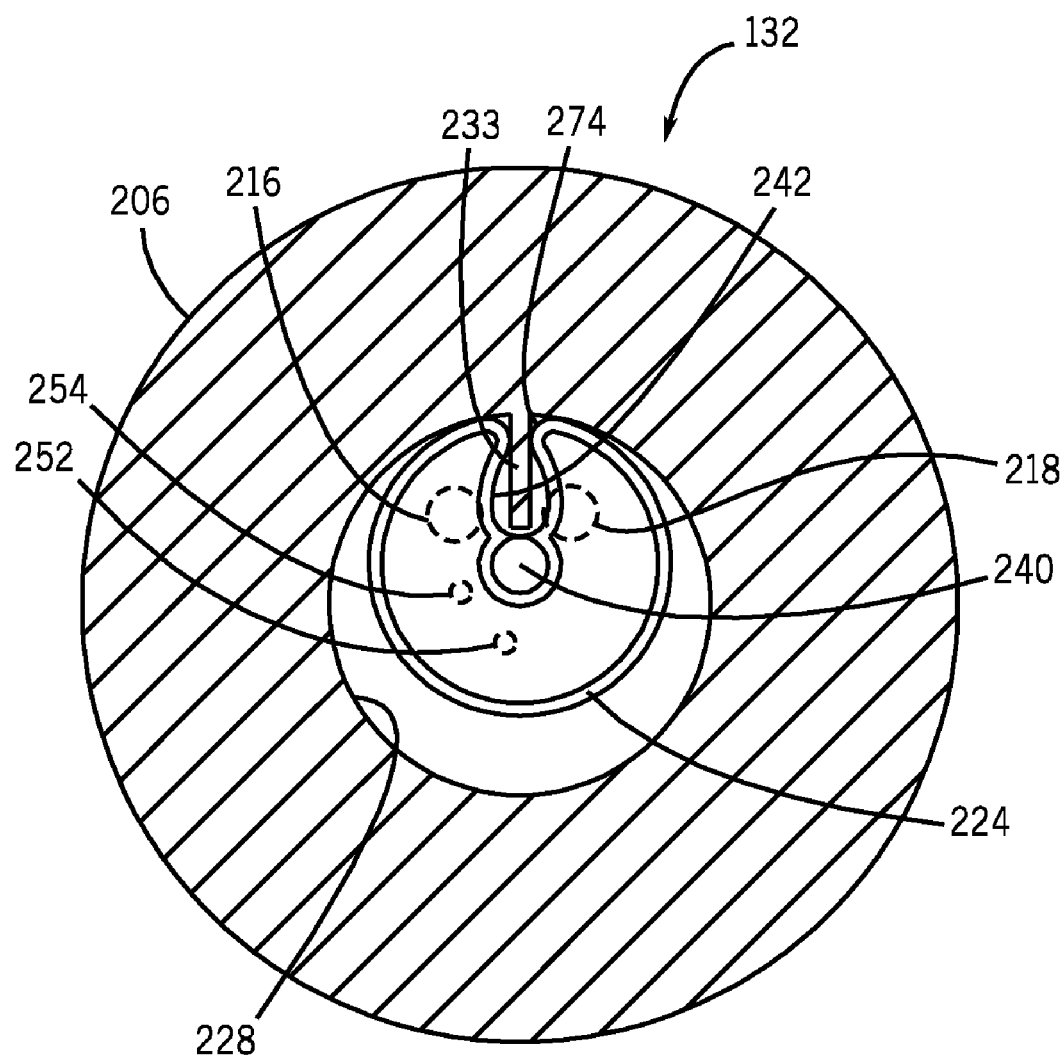
Figure 15:
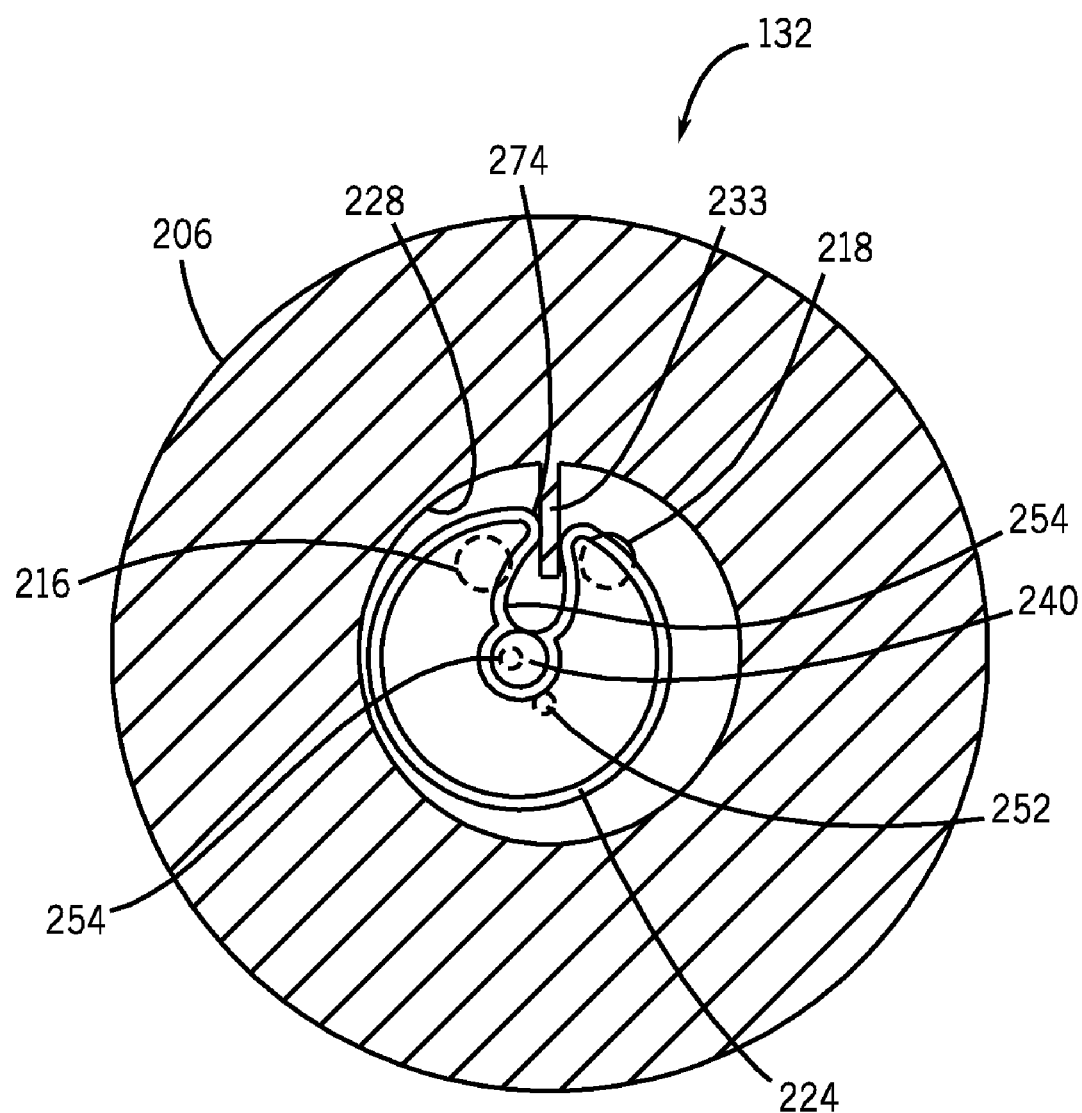

FIG. 11 illustrates an exemplary pressure equalization process 200. The process 200 may include receiving a force arising from water pressure, as indicated by block 202, and/or reducing a pressure differential between the water pressure and the pressure of a protective fluid by transmitting the force to the protective fluid, as indicated by block 204. Reducing the pressure differential may include substantially eliminating the pressure differential or substantially reducing the magnitude of the pressure differential. In some land based applications, the process 200 may include receiving a force arising from air pressure and transmitting the force to the protective fluid.

Figure 16:
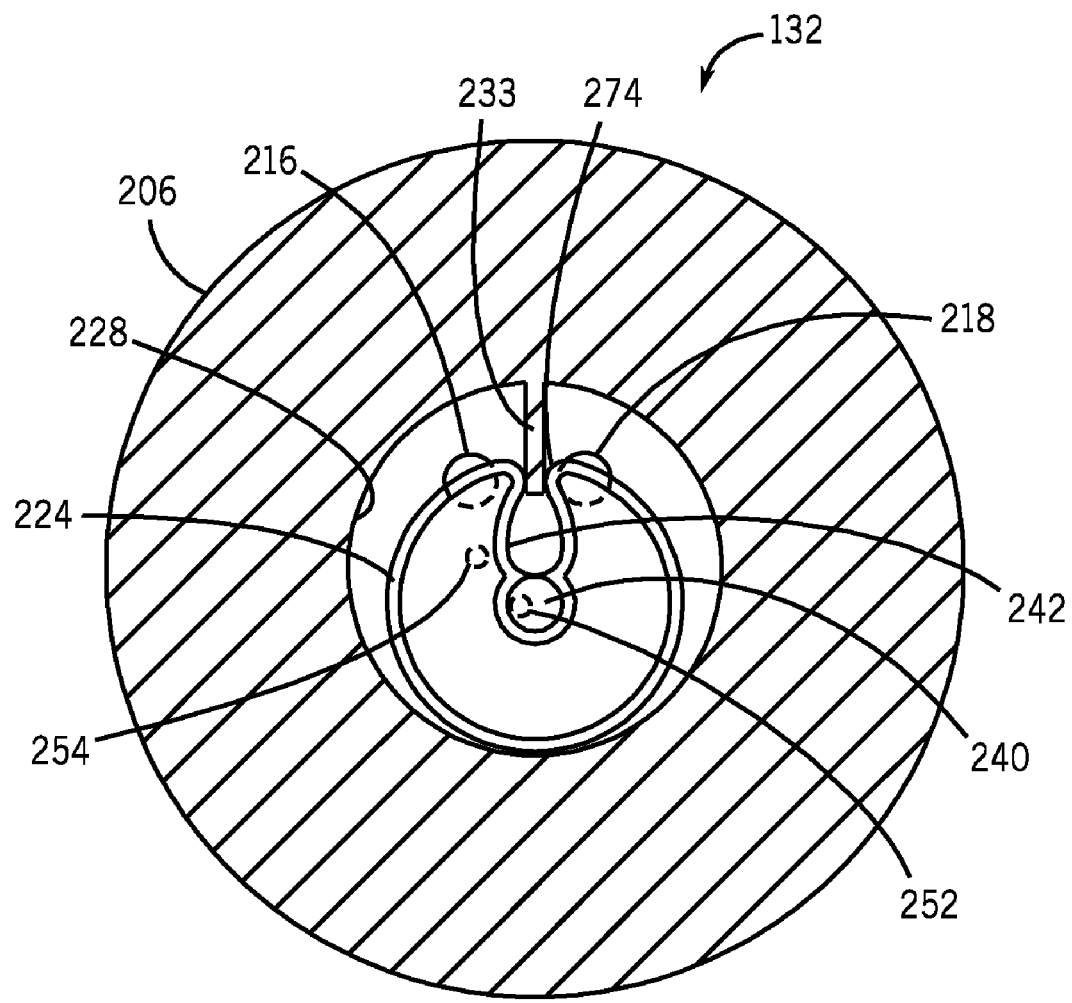
Figure 17:
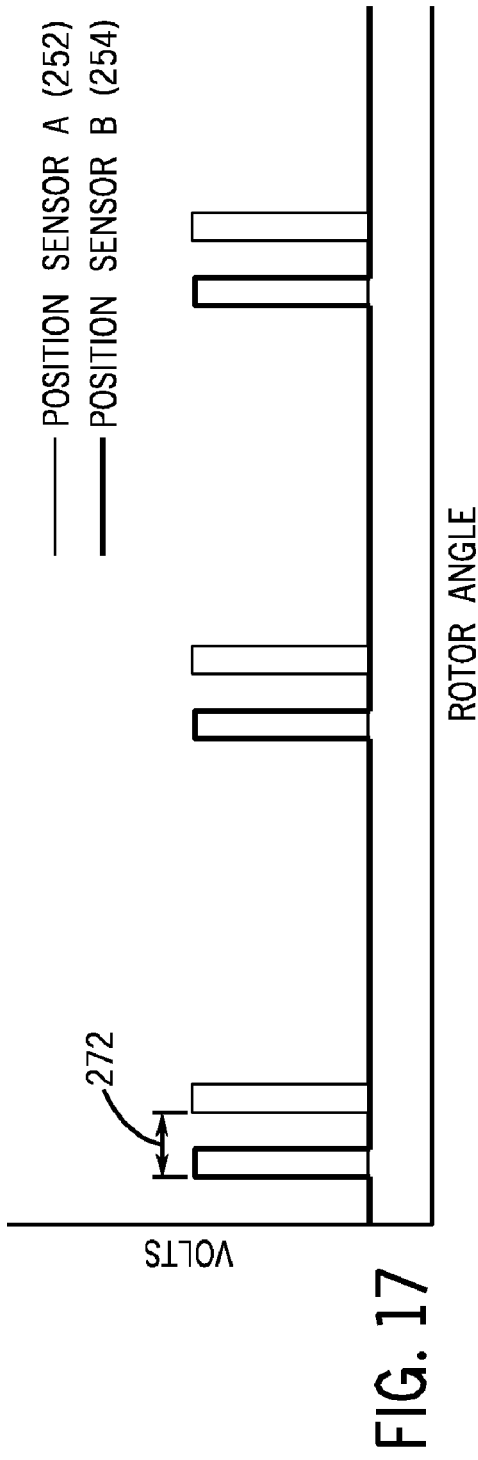
FIGS. 17 and 18 are graphs depicting position sensor signals from the flow meter of FIG. 12 during forward fluid flow and reverse fluid flow, respectively.
Figure 18:
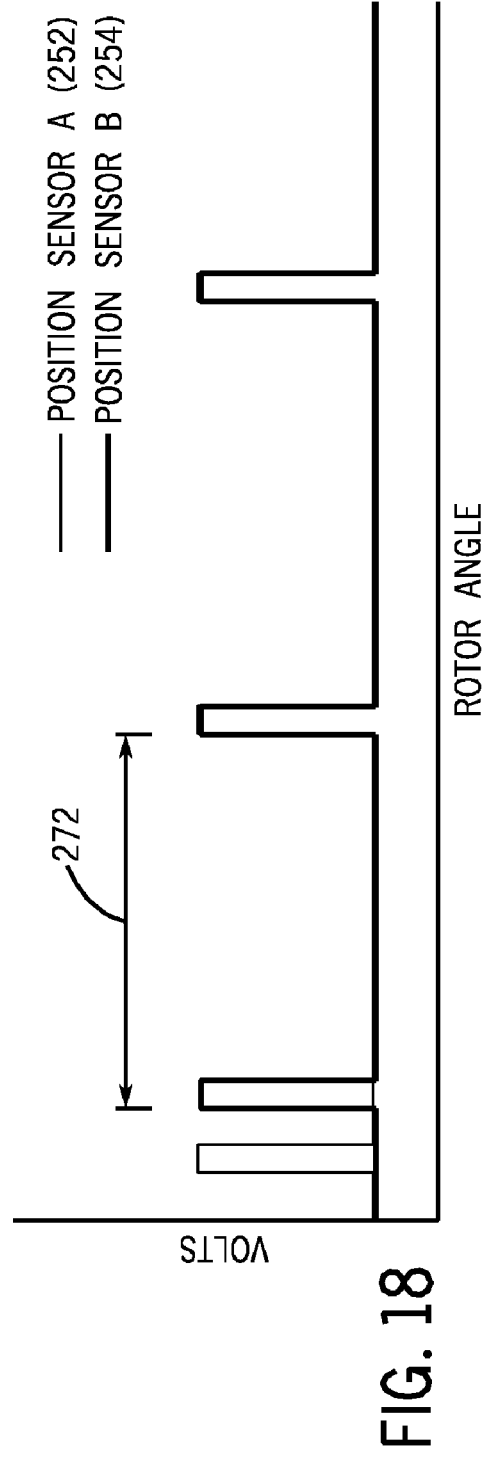

FIGS. 12-18 illustrate details of the flow meter 132. FIG. 12 is a cross-sectional side view of the flow meter 132, and FIGS. 13-16 are cross-sectional, top views depicting the flow meter 132 and sequential stages of operation. FIGS. 17 and 18 are position sensor signal traces from the flow meter 132 during forward and reverse fluid flow, respectively.

Turning to FIG. 12, the flow meter 132 may include a lower assembly 206 and an upper assembly 208. The lower assembly 206 may include a body 210 having mounts 212 and 214, a fluid-inlet passage 216, a fluid-outlet passage 218, and a metering assembly receptacle to 220.

The metering assembly receptacle 220 may generally define a right cylindrical volume and house a chamber base 222, a rotor 224, and a cap 226. A generally right cylindrical chamber 228 may be defined by the chamber base 222, and the rotor 224 may be disposed within the chamber 228. In the chamber base 222 may also include a center post 230 having a generally circular inner race 232 and a fin 233, which is visible in FIGS. 13-16. The chamber base 222, the chamber 228, the center post 230, and the inner race 232 may be generally concentric and rotationally asymmetric. The fluid-inlet passage 216 and the fluid-outlet passage 218 may extend through the chamber base 222 to the chamber 228, as illustrated in FIG. 16.

The rotor 224 may include a top disc 234, a sidewall 236, a guide member 238, and a magnet 240. Also, the rotor to 24 may include a cam slot 242, which is visible in FIGS. 13-16. The top disc 234 may have a generally circular shape with the exception of the cam slot 242, and the sidewall 236 may have a generally cylindrical-tubular shape that extends from the bottom of the top disc 234. The guide member 238 may be a generally right cylindrical member that is generally concentric with both the sidewalls 236 and the top disc 234.

The upper housing 208 may include a body 244, an outer seal 246, an inner seal 248, and a position sensor assembly 250. The position sensor assembly 250 may include position sensors 252 and 254, sensor receptacles 256 and 258, sensor mounts 260 and 262, springs 264 and 266, and position signal paths 268 and 270. The position sensors to 252 and 254 may be reed switches, Hall effect sensors, proximity switches, or other types of sensors configured to detect movement of the rotor 242. Advantageously, the two position sensors 252 and 254 may provide redundancy in the event that one of the position sensors 252 or 254 fails. The springs 264 and 266 may bias the sensor mounts 260 and 262 against the position sensors 252 and 254, respectively. The position signal paths 268 and 270 may communicatively couple to the position sensors 252 and 254, respectively.

The position sensors 252 and 254 may be positioned such that the magnet 240 passes under each position sensor 252 and 254 once during each cycle of the rotor 224. In some embodiments, the position sensor 252 may be positioned at a phase shift 272 (see FIGS. 13-16) ahead of the position sensor 254 with respect to the cycle of the rotor 224. That is, as the rotor 224 moves within the chamber 228, the magnet 240 does not pass under the position sensors 252 and 254 at the same time. Advantages of various magnitudes of phase shift 272 are described below in reference to FIGS. 17 and 18, after describing the operation of the flow meter 132.

FIGS. 13-16 illustrate four stages of a cycle of the rotor 224. The movement of the rotor 224 may be driven by a difference in fluid pressure between the fluid inlet 216 and the fluid outlet 218. The movement of the rotor 224 has both a translation component and a rotation component. The translation component may be guided by the movement of guide member 238 around the inner race 232. That is, the center of the rotor 224 may trace a circular path during each cycle. The position of the rotor 224 within the circular inner race 232 maybe referred to as a rotor angle, with a 360° shift in rotor angle generally corresponding to a cycle of the rotor 224. At the same time the rotor 224 translates, the rotor 224 rotates about a contact point 274, where it contacts the fin 233. In other words, as the rotor 224 translates through the path defined by the inner race 232, the fin 233 shifts the angular position of the rotor 224 relative to the body 210.

Each cycle of the rotor 224 may convey a discrete quantity or volume of fluid from the fluid inlet 216 to the fluid outlet 218. Additionally, during each cycle of the rotor 224, the magnet 240 may pass under each position sensor 252 and 254, and, as a result, the position sensors 252 and 254 may transmit a position sensor signal on the position signal paths 268 and 270, respectively. The controller 134 may receive the position sensor signals and count them to determine the number of times that the rotor 224 has cycled or time them to determine the rate at which the rotor 224 is cycling. By multiplying the number of cycles counted and the discrete quantity of fluid conveyed with each cycle, the controller 134 may determine a quantity of fluid passing through the flow meter 132. Similarly, by multiplying the rate at which the rotor 224 is cycling and the quantity of fluid conveyed with each cycle, the controller 134 may determine a flow rate through the flow meter 132.

FIGS. 17 and 18 depict position sensor signals during forward fluid flow and reverse fluid flow, respectively. Each time the rotor 224 passes under one of the position sensors 252 and 254, the position sensors 252 and 254 may transmit a signal indicating that the magnet 240 is proximate the sensor 252 or 254.

The direction of fluid flow may be determined by comparing the signals from the position sensors 252 and 254. In the case of forward fluid flow, depicted by FIG. 17, position sensor 252 senses the magnet 240 after the rotor 224 travels through a relatively small rotor angle from the position sensor 254. In other words, the phase shift 272 between the position sensors 252 and 254 appears relatively small. In contrast, the phase shift 272 in the reverse flow case, depicted by FIG. 18, appears relatively large. That is, the position sensor 252 senses the magnet 240 after the rotor 224 travels over a relatively large rotor angle. Thus, to determine the direction of fluid flow, the controller 134 may measure phase shift 272. If the phase shift 272 is smaller than some value, e.g., 180 degrees, then the controller 134 may determine that the fluid is in flow is in the forward direction. On the other hand, if the phase shift 272 is less than the value, then the controller 134 may determine that the fluid flow is in the reverse direction.

The controller may measure the phase shift 272 by comparing the period of the signal from one of the position sensors 252 or 254 to the time between signals from the position sensors 252 and 254. The ratio of the time between the signals to the period may generally correspond to the ratio of the phase shift 272 to a complete cycle. As a result, 360 degrees (one cycle) multiplied by the time from position sensor 254 sending a signal to position sensor 252 sending a signal, and divided by the period of the signal from position sensor 254 may generally equal the phase shift 272. In other words, the phase shift 272 may be calculated with the following equation, where $t_{signal\,A}$ is the time at which position sensor 252 senses the magnet 240, $t_{signal\,B}$ is the time at which the position sensor 254 senses the magnet 240, and $Period_{signal\,A}$ is the time between consecutive signals from the position sensor 252:

$$\text{Phase Shift} = 360 * (t_{signal\,A} - t_{signal\,B}) / \text{Period}_{signal\,A}$$

A variety of acts may be performed based on the direction of fluid flow determined by the controller 134. For instance, the direction of fluid flow, or a change in direction, may be logged in memory. In some embodiments, fluid flow in one direction (i.e., forward or reverse) may trigger an audible or visible warning (e.g., a broken pump warning on a display or speaker), or the valve 128 may be adjusted (e.g., substantially closed).

Figure 19:
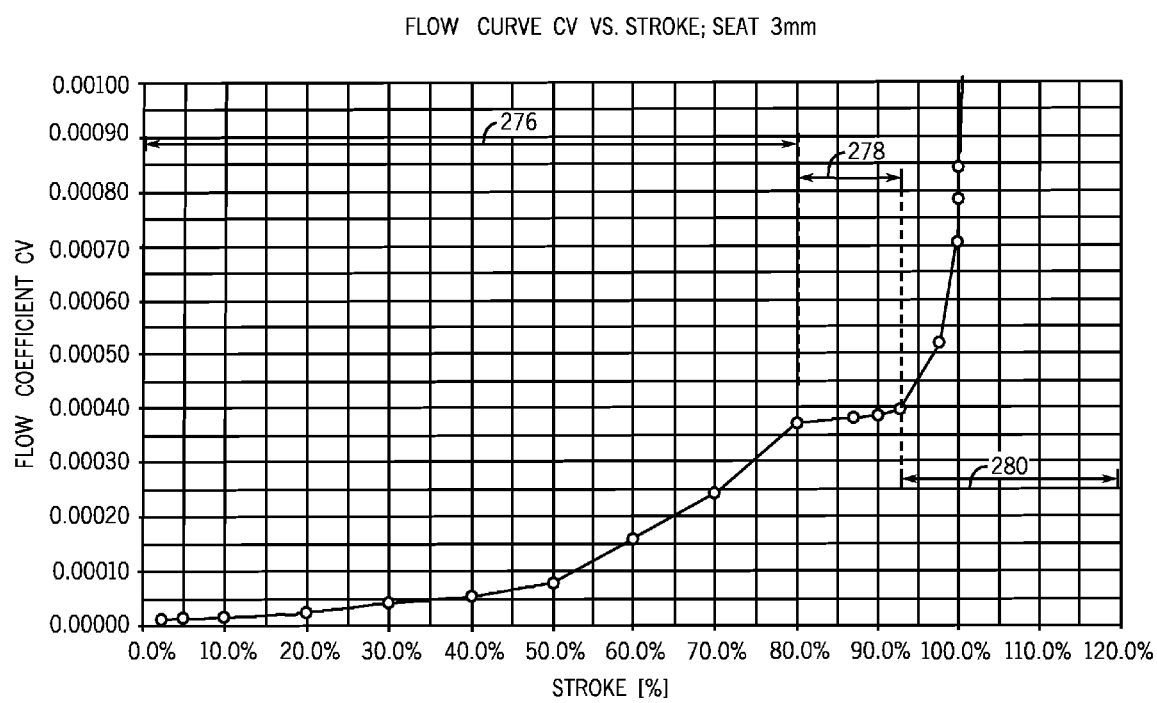
FIG. 19 is a graph depicting needle position versus flow coefficient for the valve of FIG. 7.

FIG. 19 illustrates an example of a flow curve through the valve 128. This graph depicts the position of the needle 142 (FIG. 7), as a percentage of a stroke, versus the flow coefficient (Cv) through the valve 128. The illustrated curve includes an flow control zone 276, a static zone 278, and a flushing zone 280. In some embodiments, the flushing zone 280 may be used to clear debris from the needle 142.

Figure 20:
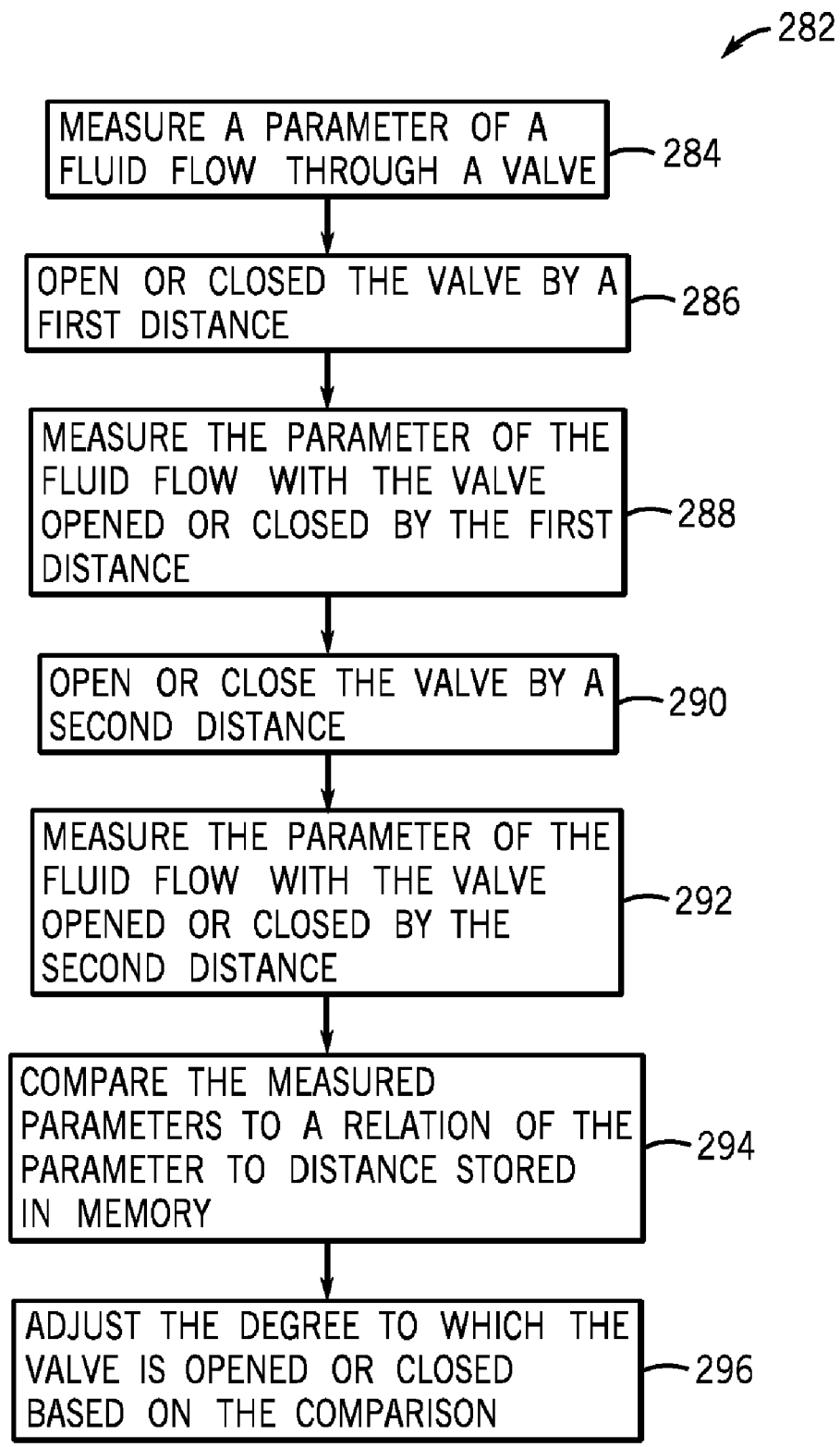
FIG. 20 is a flowchart depicting an exemplary valve-adjustment procedure in accordance with an embodiment of the present technique.

FIG. 20 illustrates an exemplary valve-adjustment procedure 282. The illustrated procedure 282 may include measuring a parameter of a fluid flowing through a valve, as illustrated by block 284. This may include the above-mentioned steps of flowing the fluid through the flow meter 132. Next, the procedure 282 may include opening or closing the valve by a first distance, as illustrated by block 286. This may include the abovementioned steps of moving the needle 142 in the valve 128. The procedure 282 may also include measuring the parameter of the fluid flow with the valve opened or closed by the first distance, as illustrated by block 288, and opening or closing the valve by a second distance, as illustrated by block 290. These acts may again include the abovementioned steps of operating the flow meter 132 and the valve 128. Next, the procedure 282 may include measuring the parameter of the fluid flow with the valve opened or closed by the second distance, as illustrated by block 292, a step which may include operating the flow meter 132. In some embodiments, the measured parameters from the steps illustrated by blocks 284, 288, and 292, may then be compared to a relationship of the parameter to distance, such as the stroke percentage of the needle 142, stored in memory. Comparing may include comparing the measured values to the above-mentioned stored correlation between needle position and flow rate through the valve 128, such as the correlation illustrated by FIG. 19. Finally, in some embodiments, the degree to which the valve is opened or closed may be adjusted based on the comparison, as illustrated by block 296.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
   a chemical-injection management unit, comprising:
   a tree interface configured to couple the chemical-injection management unit to a tree of a mineral extraction system, wherein the tree interface comprises chemical inlet, a chemical outlet, and a power connector;
   a fluid path extending from the chemical inlet to the chemical outlet;
   a valve disposed along the fluid path between the chemical inlet and the chemical outlet;
   a positive-displacement flow meter disposed along the fluid path; and
   a housing having the tree interface with the chemical inlet and the chemical outlet, wherein the valve and the positive-displacement flow meter are disposed within the housing between the chemical inlet and the chemical outlet.

2. The system of claim 1, wherein the power connecter comprises an electrical connector.

3. The system of claim 1, wherein an interior of the housing is at least partially filled with a protective fluid, and the housing comprises a pressure equalizer to equalize pressures between the protective fluid and an external fluid.

4. The system of claim 1, wherein the chemical-injection management system unit comprises:
a controller communicatively coupled to the positive-displacement flow meter;
a valve drive communicatively coupled to the controller, wherein the valve drive is coupled to the valve to move the valve between open and closed positions, wherein the controller and the valve drive are disposed within the housing.

5. The system of claim 4, wherein the controller is configured to signal the valve drive to change the degree to which the valve is open or closed based on a signal from the positive-displacement flow meter.

6. The system of claim 5, wherein the chemical-injection management unit does not use feedback relating to a position of the valve to control the position of the valve.

7. The system of claim 5, wherein controller is configured to signal the valve drive without regard to a current position of the valve drive, the valve, or a combination thereof.

8. A system, comprising:
a chemical-injection management unit, comprising:
a tree interface having a chemical inlet, a chemical outlet, a power connector, and a mechanical connector configured to couple with a tree of a mineral extraction system;
a fluid path extending from the chemical inlet to the chemical outlet;
a meter disposed along the fluid path between the chemical inlet and the chemical outlet, wherein the meter is configured to monitor a parameter of a chemical that flows through the chemical-injection management unit;
a valve disposed along the fluid path between the chemical inlet and the chemical outlet, wherein the valve is configured to selectively adjust a flow of the chemical through the chemical-injection management unit;
an actuator coupled to the valve and the power connector;
a housing having the tree interface, wherein the meter, the valve, and the actuator are all disposed within the housing between the chemical inlet and the chemical outlet; and
a protective fluid disposed within an interior of the housing.

9. The system of claim 8, wherein the actuator comprises an electric drive, the power connector comprises an electrical connector, and the meter comprises a flow meter.

10. The system of claim 8, wherein the housing comprises a torque tool interface coupled to the mechanical connector, and the mechanical connector is responsive to torque to secure the housing to the tree and progressively move the chemical inlet, the chemical outlet, and the power connector into engagement with mating connectors on the tree.

11. The system of claim 8, wherein the chemical-injection management unit comprises a pressure equalizer to equalize pressures between the protective fluid and an external fluid.

12. The system of claim 11, wherein the pressure equalizer comprises a bladder.

13. A system, comprising:
a chemical-injection management unit configured to regulate a fluid flow of a chemical into a wellhead, wherein the chemical-injection management unit comprises:
a fluid path having an chemical inlet and a chemical outlet;
a motorized valve disposed along the fluid path between the chemical inlet and the chemical outlet;
a flow meter disposed along the fluid path between the chemical inlet and the chemical outlet;
a controller communicatively coupled to both the flow meter and the motorized valve, wherein the controller is configured to control a parameter of fluid flow through the fluid path based on a feedback signal from the flow meter; and
a housing having the chemical inlet and the chemical outlet, wherein the fluid path, the motorized valve, the flow meter, and the controller are all disposed within the housing said housing comprises a tree interface having the chemical inlet, the chemical outlet, a power connector coupled to the motorized valve, and a mechanical connector configured to couple the chemical-injection management unit to a tree of a mineral extraction system.

14. The system of claim 13, wherein the flow meter comprises a positive-displacement flow meter.

15. The system of claim 13, wherein the controller is configured to exercise feed-forward control of a position of the motorized valve based on a difference between a desired value of the parameter and a value of the parameter indicated by the feedback signal.

16. The system of claim 13, wherein the motorized valve comprises a needle valve.

17. The system of claim 13, wherein the parameter of fluid flow is a volumetric flow rate.

18. The system of claim 13, comprising a tree coupled to the chemical-injection management unit and a well coupled to the tree.

19. The system of claim 1, wherein the tree interface comprises a tree interface shield extending around the chemical inlet, the chemical outlet, the power connector, and the mechanical connector, wherein the tree interface comprises at least one alignment guide.

20. The system of claim 13, wherein at least a substantial portion of an interior of the housing is filled with a protective fluid.

21. The system of claim 20, wherein the protective fluid comprises oil disposed about a motor and a gearbox of the motorized valve.

22. The system of claim 20, wherein the chemical-injection management system unit comprises a pressure equalizer disposed in the housing to equalize pressures between the protective fluid and an external fluid.

23. The system of claim 1, wherein the housing comprises a tool interface coupled to the mechanical connector.

24. The system of claim 23, wherein the tool interface comprises a torque tool interface configured to transfer torque to a drive shaft extending through the housing, and the drive shaft is configured to move the mechanical connector between a secured position and a released position relative to the tree.

25. The system of claim 23, wherein at least a substantial portion of an interior of the housing is filled with a protective fluid, and a pressure equalizer is disposed in the housing to equalize pressures between the protective fluid and an external fluid.

* * * * *